US012771429B2

(12) United States Patent
Bi et al.

(10) Patent No.: US 12,771,429 B2
(45) Date of Patent: Oct. 20, 2026

(54) COMMUNICATION METHOD AND DEVICE

(71) Applicant: HUAWEI TECHNOLOGIES CO., LTD., Shenzhen (CN)

(72) Inventors: Shuangkaisheng Bi, Shenzhen (CN); Hongli He, Beijing (CN); Xueru Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/811,790

(22) Filed: Aug. 22, 2024

(65) Prior Publication Data

US 2024/0413875 A1 Dec. 12, 2024

Related U.S. Application Data

(63) Continuation of application No. PCT/CN2022/137960, filed on Dec. 9, 2022.

(30) Foreign Application Priority Data

Feb. 23, 2022 (CN) ......................... 202210166116.7
May 6, 2022 (CN) ......................... 202210486719.5

(51) Int. Cl.
*H04B 7/06* (2006.01)
*H04B 17/10* (2015.01)
*H04W 16/28* (2009.01)

(52) U.S. Cl.
CPC ......... *H04B 7/0682* (2013.01); *H04B 17/104* (2015.01); *H04W 16/28* (2013.01)

(58) Field of Classification Search
CPC .... H04B 7/0682; H04B 17/104; H04W 16/28
USPC .......................................................... 375/267
See application file for complete search history.

(56) References Cited

U.S. PATENT DOCUMENTS

2023/0094748 A1* 3/2023 Meng .................... H04L 5/0048 375/267
2023/0275629 A1* 8/2023 Wang .................... H04W 24/02 375/262
2023/0344487 A1* 10/2023 Wang .................... H04B 7/0695
2024/0260028 A1* 8/2024 Nammi ............... H04W 72/541

FOREIGN PATENT DOCUMENTS

CN 112152689 A 12/2020
WO 2016133376 A1 8/2016
WO 2020214168 A1 10/2020
WO 2021079173 A1 4/2021
WO 2022016361 A1 1/2022

* cited by examiner

*Primary Examiner* — Kevin M Burd

(57) ABSTRACT

A first device sends M times of reference signals to a second device in a first beam direction, where each of the M times of reference signals are simultaneously sent through two groups of transmit antennas, and M is greater than or equal to 2. The first device receives first information from the second device, where the first information indicates receive phase information of the M times of reference signals. The first device determines a second beam direction based on the first information, where the second beam direction is a beam direction in which the first device sends information to the second device or the first device receives information from the second device.

19 Claims, 8 Drawing Sheets

COMMUNICATION METHOD AND DEVICE

CROSS-REFERENCE TO RELATED APPLICATIONS

This application is a continuation of International Application No. PCT/CN2022/137960, filed on Dec. 9, 2022, which claims priority to Chinese Patent Application No. 202210166116.7, filed on Feb. 23, 2022 and Chinese Patent Application No. 202210486719.5, filed on May 6, 2022. All of the aforementioned patent applications are hereby incorporated by reference in their entireties.

TECHNICAL FIELD

This application relates to the field of communication technologies, and in particular, to a communication method and device.

BACKGROUND

In an actual communication system, a base station implements directional transmission by using a beam, and a terminal device implements directional reception by using a beam aligned with the beam. However, when a location of the base station or the terminal device changes, beams currently used by the two parties may be offset to some extent. For example, a transmit beam of the base station cannot be aligned with a receive beam of the terminal device. As a result, quality of a transceiver link between the terminal device and the base station deteriorates.

Mobility is a main reason for a beam offset, and the beam offset caused by the mobility has a characteristic of continuity in space. Currently, a beam offset calibration method designed for mobility is referred to as beam tracking. For the continuity characteristic of the beam offset, a commonly used beam tracking method is that the base station periodically sends channel state information-reference signals (CSI-RS), to form a plurality of beams adjacent to the current beam. The terminal device may determine a CSI-RS with a best measurement result by measuring CSI-RSs. In this case, the base station and the terminal device may communicate with each other by using a beam pair corresponding to the CSI-RS before a next reference signal sending periodicity arrives.

Although the beam between the base station and the terminal device can be calibrated according to the method, the base station sends a large quantity of CSI-RSs. This causes high transmission overheads.

SUMMARY

Embodiments of this application provide a communication method and device, to reduce transmission overheads caused by beam tracking.

According to a first aspect, a communication method is provided. The method may be performed by a first device, may be performed by another device having a function of the first device, or may be performed by a chip system (or a chip) or another functional module. The chip system or the functional module can implement the function of the first device, and the chip system or the functional module is, for example, disposed in the first device. For example, the first device is a terminal device, and a second device is an access network device; or the first device is an access network device, and a second device is a terminal device. The method includes: sending M times of reference signals to the second device in a first beam direction, where each of the M times of reference signals are simultaneously sent through two groups of transmit antennas, when each of M−1 times of reference signals are sent, quantities of transmit antennas used in the two groups of transmit antennas are different, when the remaining one time of reference signals other than the M−1 times of reference signals are sent, quantities of transmit antennas used in the two groups of transmit antennas are the same, and M is an integer greater than or equal to 2; receiving first information from the second device, where the first information indicates receive phase information of the M times of reference signals; and determining a second beam direction based on the first information, where the second beam direction is a beam direction in which the first device sends information to the second device or the first device receives information from the second device.

A new method for determining a beam direction between two devices is proposed in this embodiment of this application. In the method, a phase is used to calibrate the beam direction between the two devices. Because the phase is used for the calibration, a small quantity of times or a small quantity of reference signals may be used. For example, M can only be greater than or equal to 2. It can be learned that because the new method for determining the beam direction is used, the first device can calibrate the beam direction without sending excessive times of reference signals. Therefore, according to technical solutions provided in this embodiment of this application, transmission overheads caused by beam tracking can be reduced.

In an optional implementation, the first information includes receive phases of the M times of reference signals; the first information includes N first phase differences, where the first phase difference is a difference between a second phase difference and a third phase difference, the second phase difference is a phase difference between two reference signals included in the remaining one time of reference signals other than the M−1 times of reference signals, the third phase difference is a phase difference between two reference signals included in one of the M−1 times of reference signals, and N is a positive integer less than M; or the first information includes M phase differences, where the M phase differences include the second phase difference and the third phase difference. The first information may include the receive phases of the M times of reference signals. The second device may calculate a corresponding phase difference by itself, and the first device does not need to perform excessive operations, so that implementation of the first device can be simplified. Alternatively, the first information may include a corresponding phase difference, to reduce a workload of the second device.

In an optional implementation, when the remaining one time of reference signals other than the M−1 times of reference signals are sent, a total quantity of transmit antennas used in the two groups of transmit antennas is a total quantity of transmit antennas of the first device. For example, a total quantity of the two groups of transmit antennas is the total quantity of transmit antennas of the first device. When the remaining one time of reference signals are sent, all transmit antennas in each of the two groups of transmit antennas may be used for sending, to improve sending quality.

In an optional implementation, the determining a second beam direction based on the first information includes: determining an offset angle of the second beam direction relative to the first beam direction based on the first information and the first beam direction. When a beam is not offset out of a main lobe, because there is a one-to-one correspondence between a phase change of a reference signal caused by the beam offset and a change of a beam direction, an offset between a current beam direction and an optimal beam direction may be determined by measuring a receive phase of a reference signal in one direction in the main lobe, so that the optimal beam direction is determined.

In an optional implementation, an antenna array of the first device is a linear array, and M=2; or an antenna array of the first device is a planar array, and M is greater than or equal to 2. For example, a quantity of times of reference signals is related to an antenna type. It can be learned that because the phase is used for the calibration, the small quantity of times or the small quantity of reference signals are used, and the first device can calibrate the beam direction without sending the excessive times of reference signals. Therefore, according to the technical solutions provided in this embodiment of this application, the transmission overheads caused by the beam tracking can be reduced.

In an optional implementation, the method further includes: sending K times of reference signals to the second device in the first beam direction, where each of the K times of reference signals are simultaneously sent through the two groups of transmit antennas, when each of the K times of reference signals are sent, quantities of transmit antennas used in the two groups of transmit antennas are the same, the K times of reference signals are used to determine a beam direction in which the second device sends information to the first device or the second device receives information from the first device, and K is a positive integer. The M times of reference signals may be used to determine a direction in which the first device sends the information to the second device or receives the information from the second device. In addition, the first device may further send the K times of reference signals to the second device. The K times of reference signals may be used to determine the beam direction in which the second device sends the information to the first device or receives the information from the first device. It is equivalent to a case in which both a beam direction of the first device relative to the second device and a beam direction of the second device relative to the first device can be determined by using the reference signal sent by the first device. A large quantity of functions can be implemented by using a type of reference signal. This can improve utilization of the reference signal. In addition, the first device and the second device do not need to change transceiver logic, and implementation is simple.

In an optional implementation, an antenna array of the second device is a linear array, and K=1; or an antenna array of the second device is a planar array, and K is greater than or equal to 1. For example, the quantity of times of reference signals is related to the antenna type. It can be learned that because the phase is used for the calibration, the small quantity of times or the small quantity of reference signals are used, and the first device can calibrate the beam direction without sending the excessive times of reference signals. Therefore, according to the technical solutions provided in this embodiment of this application, the transmission overheads caused by the beam tracking can be reduced. In addition, the remaining one time of reference signals other than the M−1 times of reference signals in the M times of reference signals may be used to determine the beam direction (for example, the second beam direction) of the first device relative to the second device, and may also be used to determine the beam direction of the second device relative to the first device. In this case, a quantity of K times of reference signals may be further reduced compared with a quantity of M times of reference signals, to further reduce the transmission overheads.

In an optional implementation, if the first device is the access network device, and the second device is the terminal device, reference signals included in the M times of reference signals are CSI-RSs or SSBs; or if the first device is the terminal device, and the second device is the access network device, reference signals included in the M times of reference signals are SRSs.

In an optional implementation, the method further includes: predicting, based on phase offset information, that the second beam direction is to change before a next reference signal sending periodicity arrives, where the phase offset information indicates a historical phase offset of a beam direction in which the first device sends the information to the second device or the first device receives the information from the second device; and sending or receiving a reference signal before the next reference signal sending periodicity arrives, where the reference signal is used to determine a third beam direction, and the third beam direction is a beam direction in which the first device sends the information to the second device or the first device receives the information from the second device. In this embodiment of this application, a scenario in which optimal beam switching may occur before the next reference signal sending periodicity arrives is considered. If the first device or the second device predicts that the optimal beam switching exists, and is before the next reference signal sending periodicity arrives, aperiodic reference signal measurement is triggered, so that an optimal beam can be adjusted in a timely manner, to increase received power on a link.

In an optional implementation, the method further includes: receiving the phase offset information from the second device. The phase offset information may be determined by the first device. For example, the first device obtains the phase offset information based on a historical phase offset status of the beam direction. Alternatively, the phase offset information may be from another device, for example, the second device. It can be learned that a manner in which the first device obtains the phase offset information is flexible.

In an optional implementation, the method further includes: sending phase offset information to the second device, where the phase offset information indicates a historical phase offset of a beam direction in which the first device sends the information to the second device or the first device receives the information from the second device, and the phase offset information is used to predict whether the second beam direction changes. In this embodiment of this application, a prediction process may be performed by the first device, or may be performed by the second device. For example, the first device may send the obtained phase offset information to the second device, so that the second device can perform prediction. Alternatively, the second device may obtain the phase offset information by itself and perform prediction, and the first device does not need to send the phase offset information, so that signaling overheads can be reduced.

According to a second aspect, another communication method is provided. The method may be performed by a second device, may be performed by another device having a function of the second device, or may be performed by a chip system (or a chip) or another functional module. The chip system or the functional module can implement the function of the second device, and the chip system or the functional module is, for example, disposed in the second device. For implementations of a first device and the second device, refer to descriptions of the first aspect. The method includes: receiving M times of reference signals from the first device in a first beam direction, where each of the M times of reference signals are received through two groups of receive antennas, when each of the M times of reference signals are received, quantities of receive antennas used in the two groups of receive antennas are the same, and M is a positive integer; and sending first information to the first device, where the first information indicates receive phase information of the M times of reference signals, and the first information is used to determine a beam direction in which the first device sends information to the second device or the first device receives information from the second device.

In an optional implementation, the first information includes receive phases of the M times of reference signals; the first information includes N first phase differences, where the first phase difference is a difference between a second phase difference and a third phase difference, the second phase difference is a phase difference between two reference signals included in the remaining one time of reference signals other than M−1 times of reference signals, the third phase difference is a phase difference between two reference signals included in one of the M−1 times of reference signals, and N is a positive integer less than M; or the first information includes M phase differences, where the M phase differences include the second phase difference and the third phase difference.

In an optional implementation, the method further includes: receiving K times of reference signals from the first device in the first beam direction, where each of the K times of reference signals are received through the two groups of receive antennas, and when each of the K times of reference signals are received, quantities of receive antennas used in the two groups of receive antennas are different; and determining a fourth beam direction based on second information, where the fourth beam direction is a beam direction in which the second device sends information to the first device or the second device receives information from the first device, the second information indicates receive phase information of the K times of reference signals, and K is a positive integer.

In an optional implementation, the second information includes receive phases of the K times of reference signals; the second information includes D fourth phase differences, where the fourth phase difference is a difference between the second phase difference and a fifth phase difference, the second phase difference is a phase difference between two reference signals included in one of the M times of reference signals, and the fifth phase difference is a phase difference between two reference signals included in one of the K times of reference signals; or the second information includes K phase differences, where the K phase differences include the fifth phase difference.

In an optional implementation, the determining a fourth beam direction based on second information includes: determining an offset angle of the fourth beam direction relative to a current beam direction based on the second information and the current beam direction in which the second device sends the information to the first device or the second device receives the information from the first device.

In an optional implementation, if the first device is an access network device, and the second device is a terminal device, reference signals included in the M times of reference signals are CSI-RSs; or if the first device is a terminal device, and the second device is an access network device, reference signals included in the M times of reference signals are SRSs.

In an optional implementation, the method further includes: predicting, based on phase offset information, that the fourth beam direction is to change before a next reference signal sending periodicity arrives, where the phase offset information indicates a historical phase offset of a beam direction in which the second device sends the information to the first device or the second device receives the information from the first device; and sending or receiving a reference signal before the next reference signal sending periodicity arrives, where the reference signal is used to determine a fifth beam direction, and the fifth beam direction is a beam direction in which the second device sends the information to the first device or the second device receives the information from the first device.

In an optional implementation, the method further includes: receiving the phase offset information from the first device.

In an optional implementation, the method further includes: sending phase offset information to the first device, where the phase offset information indicates a historical phase offset of a beam direction in which the second device sends the information to the first device or the second device receives the information from the first device, and the phase offset information is used to predict whether the fourth beam direction changes.

For technical effects brought by the second aspect or the optional implementations, refer to descriptions of technical effects of the first aspect or corresponding implementations.

According to a third aspect, a communication apparatus is provided. The communication apparatus may be the first device according to either of the first aspect and the second aspect. The communication apparatus has a function of the foregoing first device. The communication apparatus is, for example, the first device, or a functional module in the first device, for example, a baseband apparatus or a chip system (or a chip). In an optional implementation, the communication apparatus includes a baseband apparatus and a radio frequency apparatus. In another optional implementation, the communication apparatus includes a processing unit (also referred to as a processing module sometimes) and a transceiver unit (also referred to as a transceiver module sometimes). The transceiver unit can implement a sending function and a receiving function. When the transceiver unit implements the sending function, the transceiver unit may be referred to as a sending unit (also referred to as a sending module sometimes). When the transceiver unit implements the receiving function, the transceiver unit may be referred to as a receiving unit (also referred to as a receiving module sometimes). The sending unit and the receiving unit may be a same functional module, and the functional module is referred to as the transceiver unit. The functional module can implement the sending function and the receiving function. Alternatively, the sending unit and the receiving unit may be different functional modules, and the transceiver unit is a general term for the functional modules.

For example, the transceiver unit (or the sending unit) is configured to send M times of reference signals to a second device in a first beam direction, where each of the M times of reference signals are simultaneously sent through two groups of transmit antennas, when each of M−1 times of reference signals are sent, quantities of transmit antennas used in the two groups of transmit antennas are different, when the remaining one time of reference signals other than the M−1 times of reference signals are sent, quantities of transmit antennas used in the two groups of transmit antennas are the same, and M is an integer greater than or equal to 2. The transceiver unit (or the receiving unit) is further configured to receive first information from the second device, where the first information indicates receive phase information of the M times of reference signals. The processing unit is configured to determine a second beam direction based on the first information, where the second beam direction is a beam direction in which the first device sends information to the second device or the first device receives information from the second device.

In an optional implementation, the communication apparatus further includes a storage unit (also referred to as a storage module sometimes). The processing unit is configured to: be coupled to the storage unit, and execute a program or instructions in the storage unit, to enable the communication apparatus to perform the function of the first device according to either of the first aspect and the second aspect.

According to a fourth aspect, a communication apparatus is provided. The communication apparatus may be the second device according to either of the first aspect and the second aspect. The communication apparatus has a function of the foregoing second device. The communication apparatus is, for example, the second device, or a functional module in the second device, for example, a baseband apparatus or a chip system (or a chip). In an optional implementation, the communication apparatus includes a baseband apparatus and a radio frequency apparatus. In another optional implementation, the communication apparatus includes a processing unit (also referred to as a processing module sometimes) and a transceiver unit (also referred to as a transceiver module sometimes). For an implementation of the transceiver unit, refer to descriptions of the third aspect.

For example, the transceiver unit (or a receiving unit) is configured to receive M times of reference signals from a first device in a first beam direction, where each of the M times of reference signals are received through two groups of receive antennas, when each of the M times of reference signals are received, quantities of receive antennas used in the two groups of receive antennas are the same, and M is a positive integer. The transceiver unit (or a sending unit) is further configured to send first information to the first device, where the first information indicates receive phase information of the M times of reference signals, and the first information is used to determine a beam direction in which the first device sends information to the second device or the first device receives information from the second device.

In an optional implementation, the communication apparatus further includes a storage unit (also referred to as a storage module sometimes). The processing unit is configured to: be coupled to the storage unit, and execute a program or instructions in the storage unit, to enable the communication apparatus to perform the function of the second device according to either of the first aspect and the second aspect.

According to a fifth aspect, a communication system is provided, and includes the communication apparatus according to the third aspect and the communication apparatus according to the fourth aspect.

According to a sixth aspect, a computer-readable storage medium is provided. The computer-readable storage medium is configured to store a computer program or instructions. When the computer program or the instructions are run, the method performed by the first device or the second device in the foregoing aspects is implemented.

According to a seventh aspect, a computer program product including instructions is provided. When the computer program product runs on a computer, the methods in the foregoing aspects are implemented.

According to an eighth aspect, a chip system or a chip is provided, and includes a processor and an interface. The processor is configured to: invoke instructions from the interface and run the instructions, to enable the chip system to implement the methods in the foregoing aspects.

DESCRIPTION OF EMBODIMENTS

Figure 1A:
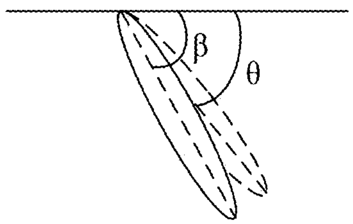
FIG. 1A is a diagram of a beam offset angle.

To make objectives, technical solutions, and advantages of embodiments of this application clearer, the following further describes embodiments of this application in detail with reference to the accompanying drawings.

The following describes some terms or concepts in embodiments of this application, to facilitate understanding of a person skilled in the art.

Embodiments of this application relate to a sending device and a receiving device. For example, both the sending device and the receiving device are terminal devices. The terminal device is a device having a wireless transceiver function, and may be a fixed device, a mobile device, a handheld device (for example, a mobile phone), a wearable device, a vehicle-mounted device, or a wireless apparatus (for example, a communication module, a modem, or a chip system) built in the foregoing device. The terminal device is configured to connect a person, an object, a machine, and the like, may be widely used in various scenarios, and includes, for example, but not limited to terminal devices in the following scenarios: cellular communication, device-to-device (D2D) communication, vehicle-to-everything (V2X), machine-to-machine/machine-type communication (M2M/MTC), internet of things (IoT), virtual reality (VR), augmented reality (AR), industrial control, self-driving, remote medical, a smart grid, smart furniture, smart office, smart wearable, smart transportation, a smart city, an uncrewed aerial vehicle, and a robot. The terminal device may be sometimes referred to as user equipment (UE), a terminal, an access station, a UE station, a remote station, a wireless communication device, a user apparatus, or the like. For ease of description, in embodiments of this application, the UE is used as an example of the terminal device for description. For example, first UE mentioned below may be replaced with a first terminal device, and second UE mentioned below may be replaced with a second terminal device.

A network device in embodiments of this application may include, for example, an access network device and/or a core network device. The access network device is a device having a wireless transceiver function, and is configured to communicate with the terminal device. The access network device includes but is not limited to a base station (base transceiver station (BTS)), a NodeB (an eNodeB/eNB or a gNodeB/gNB), a transmission reception point (TRP), a base station evolved after the 3rd generation partnership project (3GPP), an access node, a wireless relay node, and a wireless backhaul node in a wireless fidelity (Wi-Fi) system, and the like. The base station may be a macro base station, a micro base station, a pico base station, a small cell, a relay station, or the like. A plurality of base stations may support networks using a same access technology, or may support networks using different access technologies. The base station may include one or more co-site or non-co-site transmission reception points. Alternatively, the access network device may be a radio controller, a central unit (CU), and/or a distributed unit (DU) in a cloud radio access network (CRAN) scenario. Alternatively, the access network device may be a server or the like. For example, a network device in a vehicle-to-everything (V2X) technology may be a road side unit RSU). The following uses an example in which the access network device is the base station for description. The base station may communicate with the terminal device, or may communicate with the terminal device through a relay station. The terminal device may communicate with a plurality of base stations in different access technologies. The core network device is configured to implement functions such as mobility management, data processing, session management, and policy and charging. Names of devices implementing a core network function in systems using different access technologies may be different. This is not limited in embodiments of this application. A 5th generation (5G) mobile communication system is used as an example. The core network device includes an access and mobility management function (AMF), a session management function (SMF), a policy control function (PCF), a user plane function (UPF), or the like.

In embodiments of this application, a communication apparatus configured to implement a function of the network device may be a network device, or may be an apparatus, for example, a chip system, that can support the network device in implementing the function. The apparatus may be installed in the network device. In the technical solutions provided in embodiments of this application, an example in which the apparatus configured to implement the function of the network device is the network device is used to describe the technical solutions provided in embodiments of this application.

In embodiments of this application, unless otherwise specified, a quantity of nouns indicates "a singular noun or a plural noun", that is, "one or more". "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. For example, A/B indicates A or B. "At least one of the following items (pieces)" or a similar expression thereof indicates any combination of these items, including a single item (piece) or any combination of a plurality of items (pieces). For example, at least one of a, b, or c indicates a, b, c, a and b, a and c, b and c, or a, b, and c, where a, b, and c may be singular or plural.

Ordinal numbers such as "first" and "second" mentioned in embodiments of this application are used to distinguish between a plurality of objects, but are not used to limit sizes, content, sequences, time sequences, priorities, importance, or the like of the plurality of objects. For example, first information and second information may be same information, or may be different information. In addition, such a name does not indicate a difference between content, information amounts, priorities, importance, or the like of the two pieces of information. In addition, step numbers in embodiments described in this application are only used to distinguish between different steps, but are not used to limit sequences of the steps. For example, S601 may occur before S602, may occur after S602, or may occur simultaneously with S602.

The following describes related technologies in embodiments of this application.

A frequency of a millimeter-wave band ranges from 30 GHz to 300 GHz. Compared with a frequency band lower than 6 GHZ (sub-6 GHZ), the millimeter-wave band has richer spectrum resources, and can implement a higher transmission rate. However, a loss experienced by an electromagnetic wave during transmission is related to a transmission distance and a frequency of the electromagnetic wave. In particular, for a high-frequency millimeter wave, a transmission loss of the millimeter wave is large, resulting in a small system coverage distance. Therefore, in an actual communication system, the base station may implement directional transmission by using a beam, and the UE also implements directional reception by using a beam. There is a correspondence between the beam herein and a spatial filtering parameter.

Figure 1B:
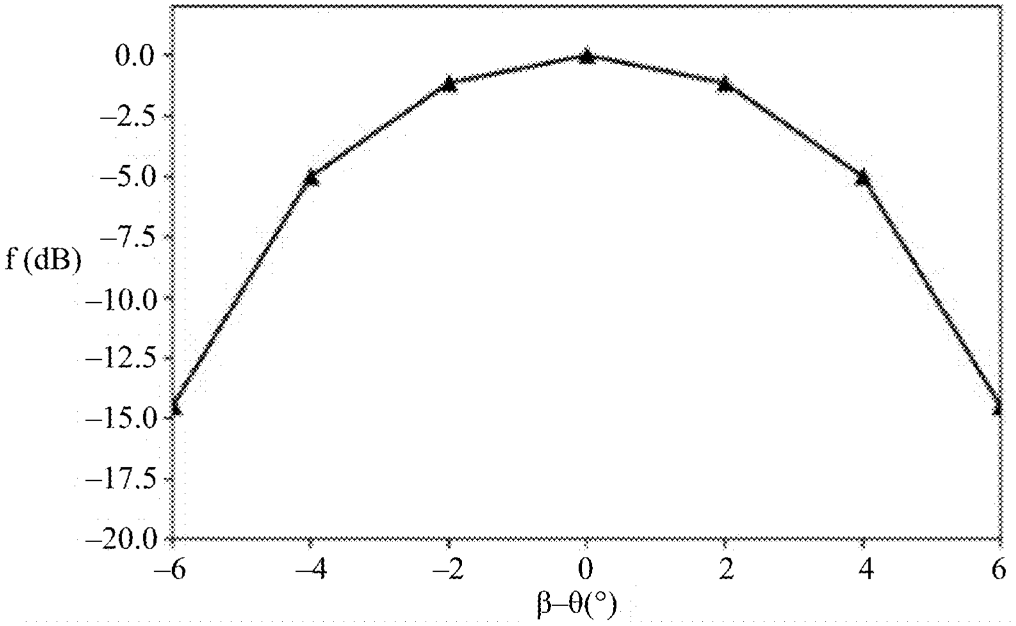
FIG. 1B is a diagram of a relationship between received power of UE and an angle difference between a current beam and an optimal beam.

A larger quantity of antennas indicates a narrower analog beam, higher energy received by the UE, and higher reliability of a transmission link. However, when the base station or the UE moves, beams currently used by the two parties may be offset to some extent. An example in which a transmit end of a reference signal is the base station, a receive end of the reference signal is the UE, and transmit antennas of the base station are arranged as a uniform linear array is used. A dimension of the array is, for example, 1×16. It is assumed that only the beam on the base station side is offset. For a result caused by the beam offset, refer to FIG. 1A and FIG. 1B. FIG. 1A shows a beam offset angle, where β represents an included angle between the current beam and a horizontal direction, and θ represents an included angle between an optimal beam and the horizontal direction. FIG. 1B shows a relationship between received power of the UE and an angle difference between the current beam and the optimal beam, where the angle difference between the current beam and the optimal beam is represented by, for example, (β−θ). It can be learned from FIG. 1B that, if the offset between the currently used beam and the optimal beam is about 4°, the overall received power of the UE decreases by about 5 dB; or if the offset between the currently used beam and the optimal beam is about 6°, the overall received power of the UE decreases by about 15 dB.

Mobility is a main reason for the beam offset, and the beam offset caused by the mobility has a characteristic of continuity in space. Currently, a beam offset calibration method designed for the mobility is referred to as beam tracking. For the continuity characteristic of the beam offset, a commonly used beam tracking method is that the base station periodically sends a CSI-RS, and may send the CSI-RS in a plurality of beam directions in each periodicity, to form a plurality of beams adjacent to the current beam. It can be learned that the base station sends a large quantity of CSI-RSs in each periodicity. The UE may determine a CSI-RS with a best measurement result by measuring the CSI-RSs. In this case, the UE may determine to use a beam corresponding to the CSI-RS to communicate with the base station before a next measurement periodicity arrives.

It is assumed that the base station sends the CSI-RS based on a periodicity of $T_0$. In this periodicity, a motion status of the UE matches a CSI-RS sending periodicity (to be specific, the optimal beam between the UE and the base station is switched based on the periodicity of $T_0$, and the UE can sense the optimal beam switching by performing measurement based on the periodicity of $T_0$). In this case, if the UE performs a behavior, for example, acceleration, deceleration, or a movement direction change, the periodicity $T_0$ may not match a future beam change trend.

Figure 2:
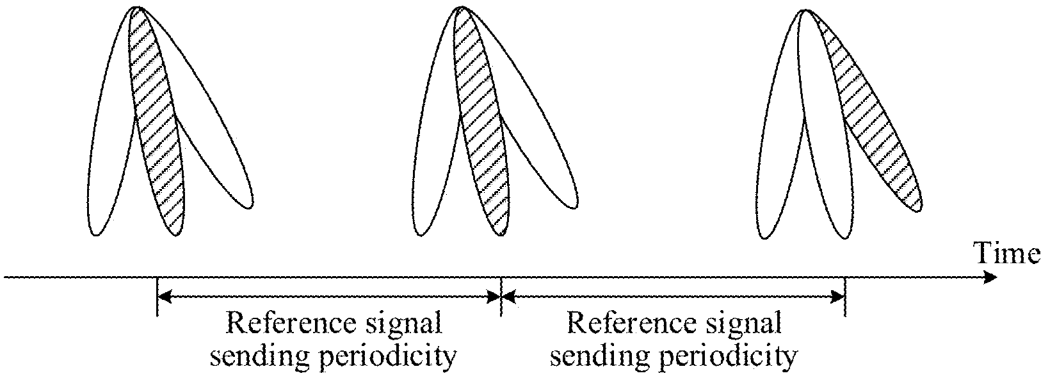
FIG. 2 is a diagram of an excessively short reference signal sending periodicity.

When a reference signal sending periodicity configured for the beam tracking does not match a trend of a beam change caused by the mobility, a case shown in FIG. 2 may occur. FIG. 2 shows two reference signal sending periodicities, but an optimal beam is switched only when the two reference signal sending periodicities end (beams drawn with slashes in FIG. 2 represent optimal beams, where it can be learned that the optimal beam is not switched when the 1st reference signal sending periodicity starts and ends, and the optimal beam is switched only when the 2nd reference signal sending periodicity ends). To be specific, in a scenario shown in FIG. 2, the reference signal sending periodicity is excessively short, and consequently CSI-RSs are excessively dense. The optimal beam may be switched only once after a plurality of reference signal sending periodicities. This causes a waste of transmission resources. Considering that the base station sends a large quantity of CSI-RSs in each reference signal sending periodicity, if the reference signal sending periodicity is excessively short, transmission resource overheads are higher.

In view of this, the technical solutions in embodiments of this application are provided. A new method for determining a beam direction between two devices is proposed in embodiments of this application. In the method, a phase is used to calibrate the beam direction between the two devices. Because the phase is used for the calibration, a small quantity of times (or a small quantity) of reference signals may be used. For example, M can only be greater than or equal to 2. It can be learned that because the new method for determining the beam direction is used, a first device can calibrate the beam direction without sending excessive times of reference signals. Therefore, according to the technical solutions provided in embodiments of this application, transmission overheads caused by beam tracking can be reduced.

The technical solutions provided in embodiments of this application may be applied to a 4th generation (4G) mobile communication system, for example, a long term evolution (LTE) system; may be applied to a 5th generation (5G) system, for example, a new radio (NR) system; or may be applied to a next-generation mobile communication system or another similar communication system. This is not specifically limited. In addition, the technical solutions provided in embodiments of this application may alternatively be applied to a device-to-device (D2D) scenario, for example, an NR-D2D scenario, or may be applied to a vehicle-to-everything (V2X) scenario, for example, an NR-V2X scenario. For example, the technical solutions may be applied to internet of vehicles, for example, V2X or vehicle-to-vehicle (V2V), or may be applied to a field, for example, intelligent driving, assisted driving, or an intelligent connected vehicle. If the technical solutions are applied to the D2D scenario, both communication parties may be UE. If the technical solutions are applied to a non-D2D scenario, one communication party may be UE, and the other communication party is a network device (for example, an access network device). Alternatively, either of or both communication parties may be electronic devices of another type other than a network device and a terminal device.

In the following description process, an example in which the communication parties are respectively the first device and a second device, and the method in embodiments of this application is applied to the non-D2D scenario is used. For example, the first device is the UE, and the second device is the access network device; or the first device is the access network device, and the second device is the UE.

Figure 3:
FIG. 3 is a diagram of an application scenario according to an embodiment of this application.

FIG. 3 shows a communication network architecture to which an embodiment of this application is applicable. All subsequently provided embodiments are applicable to the architecture. A first device can communicate with a second device. For example, the first device is a transmit end of a reference signal, and the second device is a receive end of the reference signal; or the first device is a receive end of a reference signal, and the second device is a transmit end of the reference signal.

To better describe embodiments of this application, the following describes the method provided in embodiments of this application with reference to the accompanying drawings. In the accompanying drawings corresponding to embodiments of this application, all optional steps are represented by dashed lines.

Before a method procedure is described, some related technologies in embodiments of this application are first described.

Figure 4:
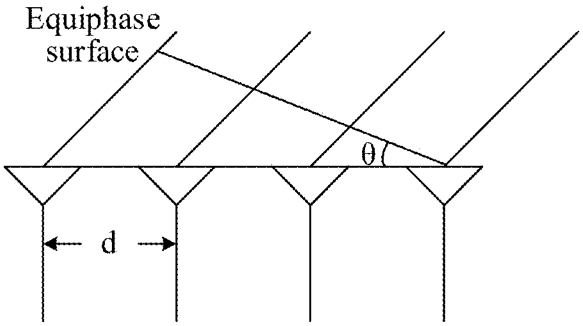
FIG. 4 is a diagram in which an antenna array at a transmit end of a reference signal is a linear array.

First, a mathematical form of a beam is described. As shown in FIG. 4, in a multi-antenna system, it is assumed that an antenna array at a transmit end of a reference signal is a linear array, and a receive end of the reference signal is located in a direction of θ from the array. A signal sent by each transmit antenna at the transmit end is superimposed at the receive end. Under a far field assumption, an optical path difference that is at the receive end and that is of electromagnetic wave signals transmitted by transmit antennas that are close to each other at the transmit end is d*sin θ (d is an antenna spacing). In embodiments of this application, both "*" and "x" represent a multiplication relationship, and the two may be replaced with each other. A receive antenna at the receive end may receive electromagnetic wave signals from different transmit antennas at the transmit end. The receive end superimposes the electromagnetic wave signals from the transmit antennas at the transmit end. A signal obtained through superimposition is used as a received signal. The receive end may perform subsequent processing on the received signal. If phases of electromagnetic wave signals sent by a plurality of transmit antennas at the transmit end are the same when the electromagnetic wave signals arrive at the receive end, received power of a signal obtained through superimposition is the highest. Therefore, in an analog beamforming technology, phase compensation is performed on a signal sent by each transmit antenna at the transmit end, so that maximum received power can be obtained for reception in a direction.

Further, beamforming between the transmit end and the receive end and an optimal beam corresponding to a channel are described in a form of a steering vector, as shown in Formula 1:

$$y = a(\theta)_t w(\beta)_t^T x + n \qquad \text{(Formula 1)}$$

In Formula 1, a physical angle of an optimal beam direction between the transmit end and the receive end is θ, and $\alpha(\theta)_t$ may represent the optimal beam. The optimal beam direction means that if the transmit end sends a signal to the receive end in the optimal beam direction, the receive end can obtain best receiving quality. For example, the transmit end is a first device, and the receive end is a second device; or the transmit end is a second device, and the receive end is a first device. A physical angle corresponding to a beamforming vector is β, and $w(\beta)_t$ may represent the beamforming vector, that is, a current transmit beam of the transmit end. x represents the signal sent by the transmit end. A subscript t represents the transmit end, n represents received noise, and y represents the received signal. Because of movement of the transmit end and/or the receive end, β≠θ. In this case, two changes: amplitude attenuation and phase rotation, are generated, because of a beam direction offset, in the signal received by the receive end. Refer to Formula 2:

$$a(\theta)_t w(\beta)_t^T = f(\sin\theta - \sin\beta) * e^{jg(\sin\theta - \sin\beta)} \qquad \text{(Formula 2)}$$

In Formula 2, f(sin θ−sin β) represents the amplitude attenuation generated in the received signal, and g(sin θ−sin β) represents the phase rotation generated in the received signal. For example, if θ≈β, $$g(\sin\theta - \sin\beta) \approx \frac{N-1}{2}\pi(\theta - \beta)\cos(\beta).$$

N represents a quantity of transmit antennas at the transmit end.

Figure 5A:
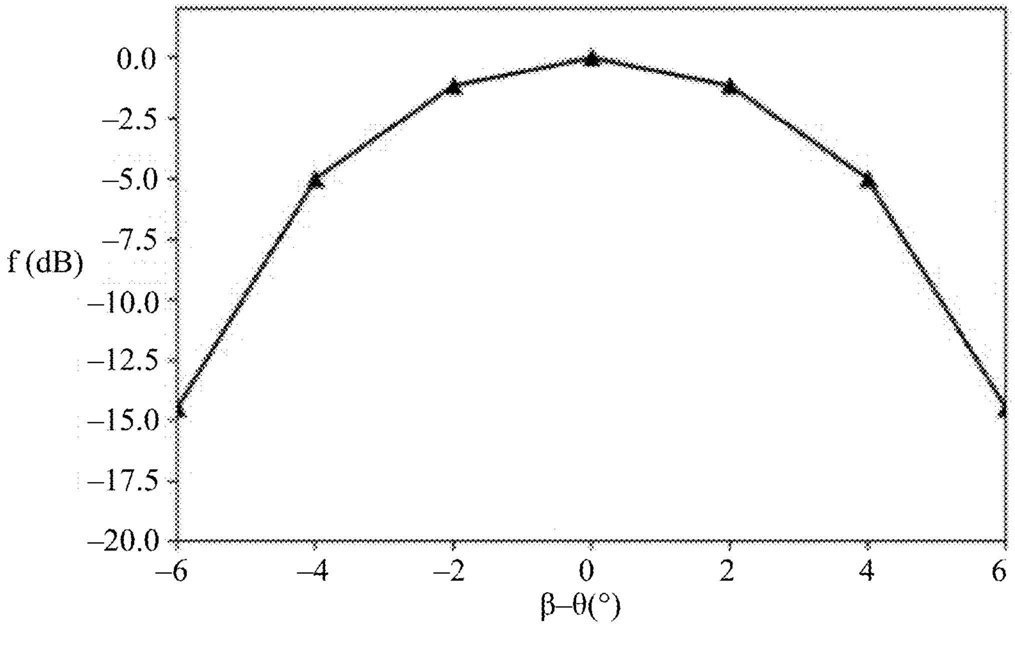
FIG. 5A is a diagram of a status of an amplitude change caused by a beam offset.
Figure 5B:
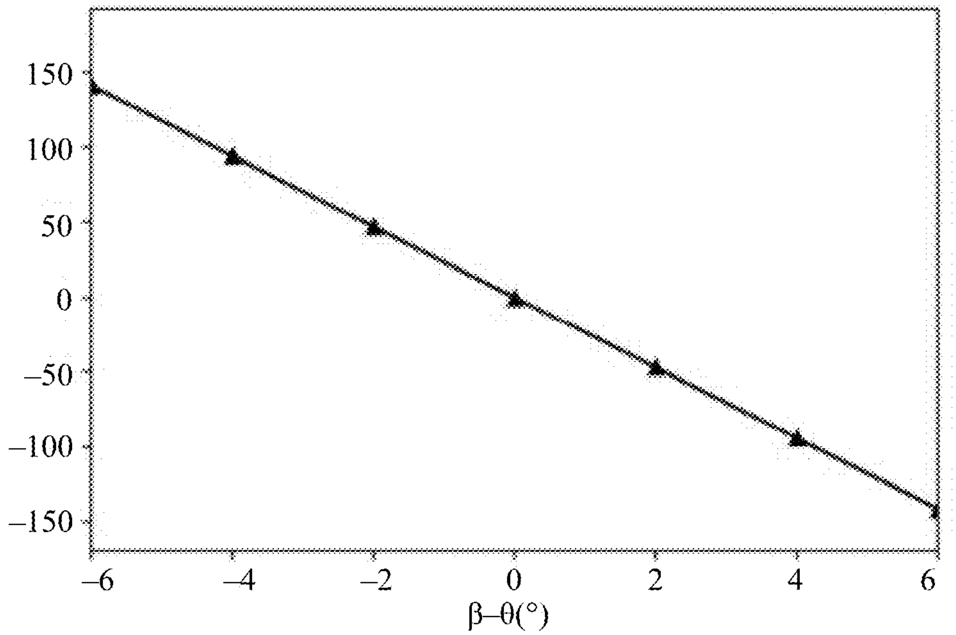
FIG. 5B is a diagram of a status of phase rotation caused by a beam offset.

FIG. 5A shows a status of an amplitude change caused by a beam offset, where a vertical axis represents an amplitude, and a horizontal axis represents an offset angle of a beam direction, that is, an offset angle of an offset beam direction relative to a current beam direction, for example, β−θ. FIG. 5B shows a status of phase rotation caused by a beam offset, where a vertical axis represents the phase rotation (unit: g°), and a horizontal axis represents a beam offset angle, for example, β−θ.

It can be learned from the foregoing derivation that: 1. When a beam is not offset out of a main lobe, because there is a one-to-one correspondence between a phase change of a reference signal caused by the beam offset and (β−θ), the optimal beam may be determined by measuring a phase of a reference signal in one direction in the main lobe. 2. When (β−θ) is small, a linearity between the phase change of the reference signal and (β−θ) is high, and an amplification coefficient (slope) is large. Therefore, the phase of the reference signal obtained through measurement can be simply converted into the angle offset of the beam direction, to determine the optimal beam direction.

In embodiments of this application, a beam direction in which a device sends information to another device may be the same as a beam direction in which the device receives information from the another device. For example, a beam direction in which the first device sends information to the second device and a beam direction in which the first device receives information from the second device are a same beam direction. Similarly, a beam direction in which the second device sends information to the first device and a beam direction in which the second device receives information from the first device are a same beam direction. To simplify the following descriptions, in embodiments of this application, the beam direction in which the first device sends the information to the second device is referred to as a beam direction between the first device and the second device for short. It can be learned that the beam direction between the first device and the second device may indicate the beam direction in which the first device sends the information to the second device or the beam direction in which the first device receives the information from the second device. In addition, the beam direction in which the second device sends the information to the first device is referred to as a beam direction between the second device and the first device for short. It can be learned that the beam direction between the second device and the first device may indicate the beam direction in which the second device sends the information to the first device or the beam direction in which the second device receives the information from the first device.

In embodiments of this application, a beam tracking process may include determining an optimal beam direction between the first device and the second device, and/or determining an optimal beam direction between the second device and the first device. Therefore, for an access network device and UE, beam tracking may include one or more manners shown in Table 1.

TABLE 1

| Beam tracking manner | Access network device | UE | Reference signal type | Mode |
|---|---|---|---|---|
| Manner 0 | CSI-RS sending | CSI-RS measurement | CSI-RS | Cross-connect mode |
| Manner 1 | CSI-RS sending | SRS sending | CSI-RS + SRS | Mutual adjustment |
| Manner 2 | SRS measurement | CSI-RS measurement | SRS + CSI-RS | Self-t adjustmen |
| Manner 3 | SRS measurement | SRS sending | SRS | Cross-connect mode |

In the manner 0, the access network device sends the CSI-RS, and the UE may determine an optimal beam direction between the UE and the access network device by measuring the CSI-RS. In addition, the UE may send, to the access network device, some or all receive phase information obtained through measurement, so that the access network device can determine an optimal beam direction between the access network device and the UE.

In the manner 1, the access network device sends the CSI-RS, and the UE may determine an optimal beam direction between the UE and the access network device by measuring the CSI-RS. In addition, the UE sends the SRS, and the access network device may determine an optimal beam direction between the access network device and the UE by measuring the SRS.

In the manner 2, the access network device sends the CSI-RS, and the UE may measure the CSI-RS, and send, to the access network device, receive phase information obtained through measurement, so that the access network device can determine an optimal beam direction between the access network device and the UE. In addition, the UE sends the SRS, and the access network device may measure the SRS, and send, to the UE, receive phase information obtained through measurement, so that the UE can determine an optimal beam direction between the UE and the access network device.

In the manner 3, the UE sends the SRS, and the access network device may determine, by measuring the SRS, an optimal beam used by the access network device to receive information from the UE. In addition, the access network device may send, to the UE, some or all receive phase information obtained through measurement, so that the UE can determine an optimal beam used by the UE to send information to the access network device.

Usually, if the UE and/or the access network device move/moves, both a beam direction of the UE relative to the access network device and a beam direction of the access network device relative to the UE may be offset. Therefore, beam adjustment on two sides of the UE and the access network device can be implemented in all of the four manners shown in Table 1, so that adjusted beam directions can be aligned.

The following respectively describes various manners shown in Table 1 by using different embodiments.

Figure 6:
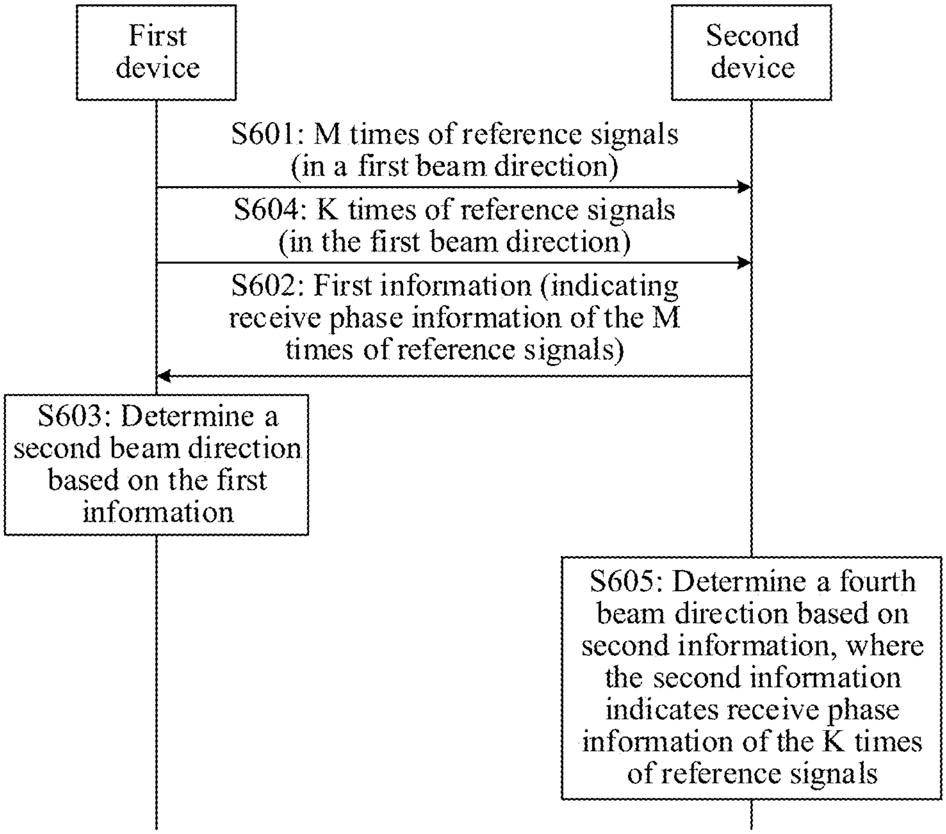
FIG. 6 is a flowchart of a first communication method according to an embodiment of this application.

An embodiment of this application provides a first communication method. For example, the manner 0 or the manner 3 in Table 1 is implemented in the method. FIG. 6 is a flowchart of the method. The method may be applied to the network architecture shown in FIG. 3. For example, a first device in the method is the first device in FIG. 3, and a second device in the method is the second device in FIG. 3. If the first device is an access network device, and the second device is UE, the manner 0 in Table 1 may be implemented in this embodiment of this application. Alternatively, if the first device is UE, and the second device is an access network device, the manner 3 in Table 1 may be implemented in this embodiment of this application.

S601: The first device sends M times of reference signals to the second device in a first beam direction. Correspondingly, the second device receives the M times of reference signals from the first device in the first beam direction. The first beam direction is a current beam direction in which the first device sends information to the second device, or is a current beam direction in which the first device receives information from the second device. For example, the first device is the access network device, the second device is the UE, and the reference signal is, for example, a CSI-RS or a synchronization signal and physical broadcast channel (PBCH) block (SSB). For another example, the first device is the UE, the second device is the access network device, and the reference signal is, for example, a sounding reference signal (SRS).

In this embodiment of this application, a phase change of the reference signal is used as reference information for beam tracking. However, after transmission of the reference signal, there may be a large quantity of phase interference factors. These phase interference factors are also considered in this embodiment of this application, to obtain phase information. For example, for the phase interference factor generated after the transmission of the reference signal, refer to Formula 3:

$$h(t_n, k\Delta f) = p(t_n) * e^{-j2\pi(f_c+k\Delta f)\tau_0} * e^{-j2\pi f_d cos\theta_n t_n} * e^{-jp_n} * a(\theta_n)_t \quad \text{(Formula 3)}$$

$p(t_n)$ represents amplitude attenuation of the reference signal. $t_n$ represents an $n^{th}$ moment. $e^{-j2\pi(f_c+k\Delta f)\tau^0}$ to represents a phase variation amount generated in a propagation process of a reference signal transmitted in a form of an electromagnetic wave, $f_c$ represents a center frequency of a carrier used to carry the reference signal, k represents a $k^{th}$ subcarrier used to carry the reference signal, $\Delta f$ represents a subcarrier spacing, and $T_0$ represents a propagation delay of the reference signal. $e^{-j2\pi f_d cos\ \theta_n t_n}$ represents a Doppler shift caused by motion of a transmit end of the reference signal and/or a receive end of the reference signal, and fa represents a Doppler frequency. $e^{-jpn}$ represents phase noise caused by a crystal oscillator of a transceiver at the transmit end of the reference signal, and $p_n$ represents phase noise at a current moment. Because a subscript t represents the transmit end, $\theta_n$ represents an angle of an optimal transmit beam of the transmit end at the $n^{th}$ moment, and $\alpha(\theta_n)_t$ represents a channel steering vector between the transmit end and the receive end in a direction of $\theta_n$ at the $n^{th}$ moment.

Figure 7:
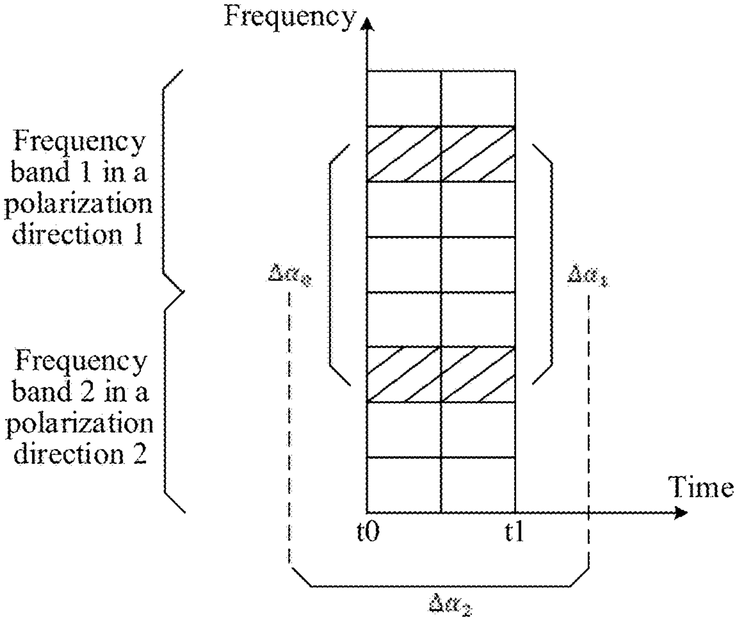
FIG. 7 is a diagram of a differential elimination manner according to an embodiment of this application.

$e^{-j2\pi(f_c+k\Delta f)\tau_0}$ to and $e^{-j2\pi f_d cos\ \theta_n t_n}$ are slow variables on a time scale, usually have time-domain correlation, and may be eliminated in a form of time-domain difference. $e^{-jp_n}$ is a fast variable on the time scale, and usually has no time-domain correlation. Therefore, another elimination manner is considered. In an elimination manner provided in this embodiment of this application, a same crystal oscillator is used to send reference signals at a same moment through different transmit antennas, so that $e^{-jp_n}$ can be eliminated in a differential manner based on receive phases (the receive phase is a phase of the reference signal received by the receive end) of the reference signals. For example, the transmit end of the reference signals may use a same crystal oscillator to send the reference signals at a same moment through two groups of transmit antennas, so that $e^{-jp_n}$ can be eliminated in a differential manner. The differential elimination manner (or the reference signal sending manner) may be a dual-polarized frequency division multiplexing (frequency division multiplexing, FDM) manner. FIG. 7 is a diagram of differential elimination.

In FIG. 7, an example in which the transmit end of the reference signals sends the reference signals at a same moment through two groups of transmit antennas is used. Transmit directions of the two groups of transmit antennas are respectively referred to as a polarization direction 1 and a polarization direction 2. The transmit end sends one time of reference signals at a moment to, where this time of reference signals include two reference signals simultaneously sent in the polarization direction 1 and the polarization direction 2. In addition, the transmit end also sends one time of reference signals at a moment t1, where this time of reference signals also include two reference signals simultaneously sent in the polarization direction 1 and the polarization direction 2. The reference signal sent in the polarization direction 1 is carried on a frequency band 1, and the reference signal sent in the polarization direction 2 is carried on a frequency band 2. In FIG. 7, blocks drawn with slashes represent reference signals. All transmit antennas of a device may use a same crystal oscillator.

In FIG. 7, for example, at the moment to, quantities of transmit antennas used at the transmit end in the two groups of transmit antennas are the same. In other words, at the moment to, the reference signals sent at the transmit end in the two polarization directions are sent through the same quantity of transmit antennas. At the moment t1, quantities of transmit antennas used at the transmit end in the two groups of transmit antennas are different. In other words, at the moment t1, the reference signals sent at the transmit end in the two polarization directions are sent through the different quantities of transmit antennas. For example, for the moment to, a phase difference between two reference signals received by the receive end in the two polarization directions may be determined, and the phase difference may be represented as $\Delta\alpha_0$. For the moment t1, a phase difference between two reference signals received by the receive end in the two polarization directions may also be determined, and the phase difference may be represented as $\Delta\alpha_1$.

$$\Delta\alpha_0 = \text{angle}(RS_1)_{t0} - \text{angle}(RS_2)_{t0} = \delta + 2\pi n\Delta f\tau_0.$$

$$\Delta\alpha_1 = \text{angle}(RS_1)_{t1} - \text{angle}(RS_2)_{t1} = \delta + 2\pi n\Delta f\tau_0 + \frac{N_1 - N_2}{2}\pi(\theta_n - \beta_n)\cos(\beta_n).$$

angle $(RS_1)_{t0}$ represents a phase of a reference signal received by the receive end in the polarization direction 1 at the moment to, and angle $(RS_2)_{t0}$ to represents a phase of a reference signal received by the receive end in the polarization direction 2 at the moment t0. angle $(RS_1)_{t1}$ represents a phase of a reference signal received by the receive end in the polarization direction 1 at the moment t1, and angle $(RS_2)_{t1}$ represents a phase of a reference signal received by the receive end in the polarization direction 2 at the moment t1. $\delta$ represents a phase difference between antennas in the two polarization directions. The phase difference herein is a result of joint actions of the transmit antenna at the transmit end and a receive antenna at the receive end on a receiving pilot. n represents a subscript difference between subcarriers of two reference signals in frequency domain, $\Delta f$ represents a subcarrier spacing, and $\tau_0$ represents a propagation delay of an electromagnetic wave. $\beta_n$ represents an actual beam direction at a current moment (or an angle of the actual beam direction at the current moment), and $\theta_n$ represents an optimal beam direction at the current moment (or an angle of the optimal beam direction at the current moment). If $\Delta\alpha_1$ (or $\Delta\alpha_1$ and $\Delta\alpha_0$) is used to determine an optimal beam direction between the transmit end and the receive end, $\beta_n$ represents an actual transmit beam direction between the transmit end and the receive end at the current moment, and $\theta_n$ represents an optimal transmit beam direction between the transmit end and the receive end at the current moment. Alternatively, if $\Delta\alpha_1$ (or $\Delta\alpha_1$ and $\Delta\alpha_0$) is used to determine an optimal beam direction between the receive end and the transmit end, $\beta_n$ represents an actual receive beam direction between the receive end and the transmit end at the current moment, and $\theta_n$ represents an optimal receive beam direction between the receive end and the transmit end at the current moment. $N_1$ represents a quantity of transmit antennas used by the transmit end in the polarization direction 1 at the moment t1, and $N_2$ represents a quantity of transmit antennas used by the transmit end in the polarization direction 2 at the moment t1.

The differential elimination may be performed based on $\Delta\alpha_0$ and $\Delta\alpha_1$. For example, in a differential elimination manner, $\Delta\alpha_2$ is obtained based on $\Delta\alpha_0$ and $\Delta\alpha_1$, for example, $$\Delta\alpha_2 = \Delta\alpha_1 - \Delta\alpha_0 = \frac{N_1 - N_2}{2}\pi(\theta_n - \beta_n)\cos(\beta_n).$$

In this case, $\Delta\alpha_2$ is considered as a result obtained through the differential elimination. The result may be phase rotation generated in a received signal, that is, $\Delta\alpha_2$ may be equal to g(sin $\theta$–sin $\beta$). $\Delta\alpha_2$ is used as g(sin $\theta$–sin $\beta$) and is substituted into Formula 2. $\beta$ is also a known quantity. For example, $\beta$ is an angle of a current beam direction. In this case, $\theta$ may be determined according to Formula 2. In this way, a current optimal beam direction is determined, and therefore the current beam direction may be adjusted to the optimal beam direction. The optimal beam direction is, for example, a beam direction between the first device and the second device.

It can be learned from the foregoing descriptions that, to eliminate $e^{-JP_n}$, the transmit end may use the same crystal oscillator to send the reference signals at the same moment through different transmit antennas. Therefore, in this embodiment of this application, the first device may include two groups of transmit antennas, and the two groups of transmit antennas may include a same quantity of antennas. For example, a total quantity of transmit antennas included in the two groups of transmit antennas is equal to a total quantity of transmit antennas included in the first device. In embodiments of this application, a transmit antenna of a device may be a receive antenna of the device. In other words, an antenna can complete both a transmitting function and a receiving function. For example, the transmit antenna of the first device may be a receive antenna of the first device, and a transmit antenna of the second device may be a receive antenna of the second device. Alternatively, a transmit antenna and a receive antenna of a device may be different antennas. For example, the first device may include one or more transmit antennas, and include one or more receive antennas. The transmit antennas included in the first device may be further divided into two groups of transmit antennas, and the receive antennas included in the first device may also be divided into two groups of receive antennas. Similarly, the second device may include one or more transmit antennas, and include one or more receive antennas. The transmit antennas included in the second device may be further divided into two groups of transmit antennas, and the receive antennas included in the second device may also be divided into two groups of receive antennas.

For example, if the optimal beam direction between the first device and the second device is to be determined, a determining manner is that the first device may send M times of reference signals to the second device, where each of the M times of reference signals may be sent through two groups of transmit antennas. For example, if a reference signal sent by each group of transmit antennas is considered as one reference signal, each time of reference signals may include two reference signals, and one group of transmit antennas send one of the reference signals. In other words, the first device simultaneously sends the reference signals through the two groups of transmit antennas each time, and sends the reference signals for M times in total. The optimal beam direction between the first device and the second device can be determined by using the M times of reference signals.

M is a positive integer. For example, M may be greater than or equal to 2. Optionally, a value of M may be related to an antenna type of the first device, and the antenna type is, for example, a transmit antenna type of the first device. In embodiments of this application, the antenna type is, for example, a degree of freedom of an antenna. For example, the antenna type includes a form of an antenna array. For example, if the transmit antenna type of the first device indicates that a transmit antenna array of the first device is a linear array, M may be equal to 2, and the optimal beam direction between the first device and the second device may be determined through the process shown in FIG. 7. Alternatively, if the transmit antenna type of the first device indicates that a transmit antenna array of the first device is a planar array, each transmit antenna of the first device may be considered as including two transmit channels in a horizontal direction and a vertical direction, and M may be greater than or equal to 2. For example, if an optimal beam direction between the first device and the second device in the horizontal direction or the vertical direction is to be determined by using the M times of reference signals, which is equivalent to a case in which the optimal beam direction between the first device and the second device is to be determined in only one direction (the horizontal direction or the vertical direction), M may be equal to 2. Alternatively, if optimal beam directions between the first device and the second device in the horizontal direction and the vertical direction are to be determined by using the M times of reference signals, which is equivalent to a case in which the optimal beam direction between the first device and the second device is to be determined in both the horizontal direction and the vertical direction, M may be greater than 2. For example, M may be equal to 3. One of the three times of reference signals may be considered as base reference signals. The base reference signals may be used when the optimal beam direction between the first device and the second device is determined in both the horizontal direction and the vertical direction. Remaining two of the three times of reference signals may be respectively used to determine the optimal beam direction between the first device and the second device in the horizontal direction and the optimal beam direction between the first device and the second device in the vertical direction. For example, the $1^{st}$ time of reference signals and the $2^{nd}$ time of reference signals in the three times of reference signals are used to determine the optimal beam direction between the first device and the second device in the horizontal direction. The $1^{st}$ time of reference signals and the 3rd time of reference signals are used to determine the optimal beam direction between the first device and the second device in the vertical direction.

As described in the previous paragraph, if the transmit antenna array of the first device is the linear array, or the transmit antenna array of the first device is the planar array, and the optimal beam direction between the first device and the second device in the horizontal direction or the vertical direction are to be determined by using the M times of reference signals, M may be equal to 2. Optionally, in these cases, M may alternatively be greater than 2. For example, noise interference can be reduced and accuracy of a determined beam direction can be improved by performing smooth processing on receive phases of a plurality of times of reference signals. A case in which M may be equal to 3 and that is described in the previous paragraph is similar. In other words, M may alternatively be greater than 3. Details are not described. In addition, this processing manner may also be used in similar cases in embodiments of this application. Details are not described again below.

When one of the M times of reference signals are sent, quantities of transmit antennas used by the first device in the two groups of transmit antennas may be the same. For example, the first device uses all transmit antennas in each of the two groups of transmit antennas. If the total quantity of the two groups of transmit antennas is equal to the total quantity of transmit antennas of the first device, it is equivalent to a case in which the first device uses all transmit antennas to send this time of reference signals. For example, this time of reference signals are referred to as an $M_1^{th}$ time of reference signals. A sending sequence (or a location of the $M_1^{th}$ time of reference signals in the M times of reference signals in a sending process) of the $M_1^{th}$ time of reference signals is not limited. For example, the sending sequence of the $M_1^{th}$ time of reference signals may be before M−1 times of reference signals, after M−1 times of reference signals, or during M−1 times of reference signals. That the sending sequence of the $M_1^{th}$ time of reference signals is during the M−1 times of reference signals means that a previous time of reference signals of the $M_1^{th}$ time of reference signals are one of the M−1 times of reference signals, and a next time of reference signals of the $M_1^{th}$ time of reference signals are also one of the M−1 times of reference signals. The M−1 times of reference signals are remaining reference signals other than the $M_1^{th}$ time of reference signals in the M times of reference signals. The sending sequence of the $M_1^{th}$ time of reference signals may be negotiated by the first device and the second device in advance, may be determined by the first device and then notified to the second device, or may be determined by the second device and then indicated to the first device. In other words, both the first device and the second device can determine the sending sequence of the $M_1^{th}$ time of reference signals. The $M_1^{th}$ time of reference signals may be considered as base reference signals. For example, based on the descriptions in the previous paragraph, when M is 3, one of the three times of reference signals may be considered as the base reference signals, and the base reference signals may be the $M_1^{th}$ time of reference signals. Alternatively, when M is greater than or equal to 2, the M times of reference signals may also include the $M_1^{th}$ time of reference signals, and the $M_1^{th}$ time of reference signals may also be considered as base reference signals. The base reference signal may be understood as that the base reference signal may be used to determine both the optimal beam direction between the first device and the second device and an optimal beam direction between the second device and the first device.

In addition to the $M_1^{th}$ time of reference signals, the M times of reference signals further include the M−1 times of reference signals. When the first device sends each of the M−1 times of reference signals, quantities of transmit antennas used in the two groups of transmit antennas may be different. The difference herein is for each of the M−1 times of reference signals. To be specific, when each time of reference signals are sent, the quantities of transmit antennas used in the two groups of transmit antennas are different, and when different times of reference signals are sent, quantities of transmit antennas used in a group of transmit antennas may be the same or different.

Figure 8A:
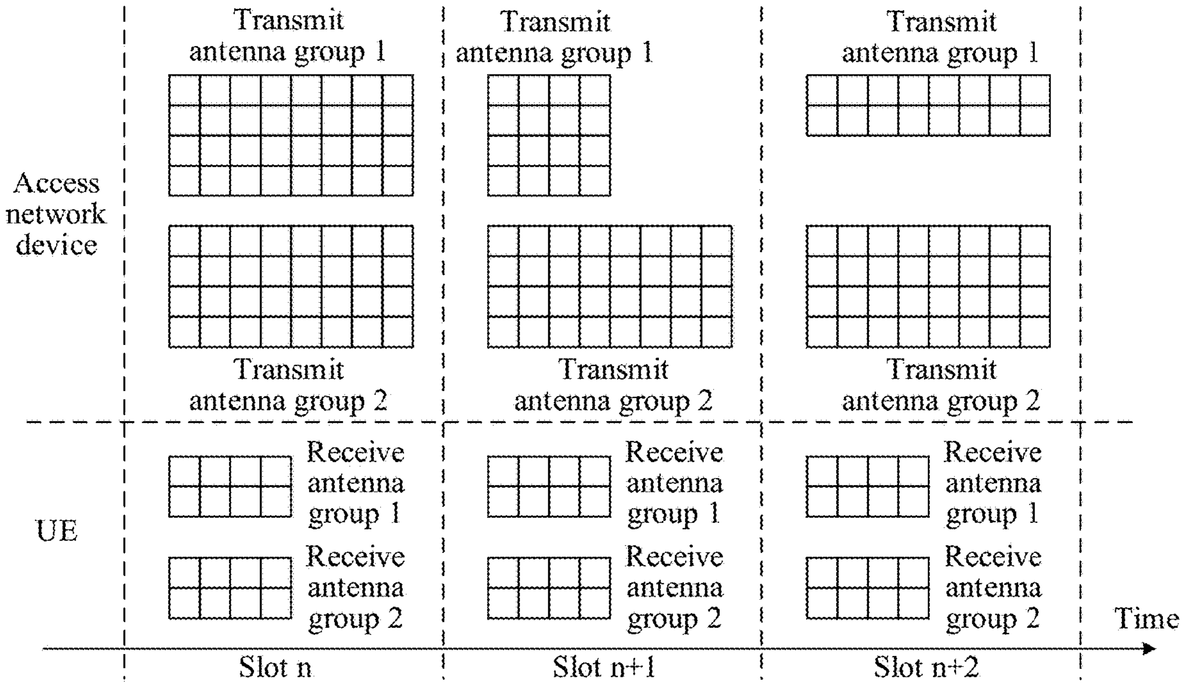
FIG. 8A is a diagram of using different transmit antennas when a first device sends one time of reference signals according to an embodiment of this application.

FIG. 8A is a diagram of using different transmit antennas when the first device sends one time of reference signals. In FIG. 8A, an example in which each group of transmit antenna arrays of the first device is an 8*4 planar array, and the optimal beam directions in the horizontal direction and the vertical direction are to be determined is used. Therefore, M=3 is also used as an example. If the $1^{st}$ time of reference signals in time domain are the $M_1^{th}$ time of reference signals, when the $1^{st}$ time of reference signals (one time of reference signals corresponding to a slot n in FIG. 8A) are sent, quantities of transmit antennas used in the two groups of transmit antennas are the same, and respectively are, for example, total quantities of transmit antennas in the two groups. When the $2^{nd}$ time of reference signals are sent, a quantity of transmit antennas used in a transmit antenna group 1 is a total quantity of transmit antennas included in the group of transmit antennas, and a quantity of transmit antennas used in a transmit antenna group 2 is a half of a total quantity of the group of transmit antennas. When the 3rd time of reference signals are sent, a quantity of transmit antennas used in the transmit antenna group 1 is a total quantity of transmit antennas included in the group of transmit antennas, and a quantity of transmit antennas used in the transmit antenna group 2 is a half of a total quantity of the group of transmit antennas. When the $2^{nd}$ time of reference signals and the 3rd time of reference signals are sent, although the quantity of transmit antennas used in the transmit antenna group 2 is the half of the total quantity of the group of transmit antennas, specifically used transmit antennas may be the same or different. In FIG. 8A, that different transmit antennas are used is used as an example.

The second device may include two groups of receive antennas, and the two groups of receive antennas may include a same quantity of antennas. For example, a total quantity of receive antennas included in the two groups of receive antennas is equal to a total quantity of receive antennas included in the second device. The second device may use the two groups of receive antennas when receiving each of the M times of reference signals. The two groups of receive antennas may be configured to receive the reference signals sent by the two groups of transmit antennas of the first device. In embodiments of this application, a reference signal sent by one group of transmit antennas of the first device at a time is considered as one reference signal, and a reference signal received by one group of receive antennas of the second device at a time is also considered as one reference signal. In this case, the two groups of receive antennas of the second device may receive two reference signals at a time, and each group of receive antennas receive one of the reference signals. For example, the reference signal sent by one group of transmit antennas of the first device is received by one group of receive antennas of the second device.

Because the M times of reference signals are used to determine the optimal beam direction between the first device and the second device, when the second device receives each of the M times of reference signals, quantities of receive antennas used in the two groups of receive antennas may be the same. For example, when receiving each of the M times of reference signals, the second device uses all receive antennas in each of the two groups of receive antennas. If the total quantity of the two groups of receive antennas is equal to the total quantity of receive antennas of the second device, it is equivalent to a case in which the second device uses all receive antennas to receive each of the M times of reference signals. For example, in FIG. 8A, when the second device receives each of the three times of reference signals, quantities of receive antennas used in the two groups of receive antennas are the same. In FIG. 8A, an example in which each group of receive antenna arrays of the second device is a 4*2 planar array is used.

S602: The second device sends first information to the first device. Correspondingly, the first device receives the first information from the second device.

After receiving the M times of reference signals, the second device may determine, through measurement, receive phases of two reference signals included in each of the M times of reference signals, and may obtain the first information based on the determined receive phases. The first information may indicate receive phase information of the M times of reference signals. Because the first device will determine the optimal beam direction between the first device and the second device, the second device may send the first information to the first device, and the first device may determine the optimal beam direction between the first device and the second device based on the first information.

Optionally, the first information may include receive phases of the M times of reference signals. If FIG. 7 is used as an example, M=2. The first information may include two receive phases of one of the M times of received reference signals at the two groups of receive antennas of the second device, for example, angle $(RS_1)_{t0}$ and angle $(RS_2)_{t0}$ corresponding to FIG. 7. In addition, the first information may further include two receive phases of the other time of reference signals in the M times of received reference signals at the two groups of receive antennas of the second device, for example, angle $(RS_1)_{t1}$ and angle $(RS_2)_{t1}$ corresponding to FIG. 7. After receiving the first information, the first device may perform differential elimination based on the first information. For example, the first device may determine $\Delta\alpha_2$ based on the first information, to determine the optimal beam direction between the first device and the second device based on $\Delta\alpha_2$.

Alternatively, the first information may include M phase differences, where the M phase differences may include a second phase difference and a third phase difference. The second phase difference is a phase difference between two reference signals included in the $M_1^{th}$ time of reference signals, and the third phase difference is a phase difference between two reference signals included in one of the M−1 times of reference signals. If FIG. 7 is used as an example, M=2. For example, in FIG. 7, if one time of reference signals sent at the moment to are the $M_1^{th}$ time of reference signals, and one time of reference signals sent at the moment t1 are the M−1 times of reference signals, $\Delta\alpha_0$ is the second phase difference, $\Delta\alpha_1$ is the third phase difference, and the first information may include $\Delta\alpha_0$ and $\Delta\alpha_1$. After receiving the first information, the first device may perform differential elimination based on the first information. For example, the first device may determine $\Delta\alpha_2$ based on the first information, to determine the optimal beam direction between the first device and the second device based on $\Delta\alpha_2$.

Alternatively, the first information may include N first phase differences, where N is a positive integer. For example, N is less than M. For example, if M=2, N=1; or if M=3, N may be equal to 1 or 2. One of the N first phase differences is, for example, a difference between the second phase difference and the third phase difference. If FIG. 7 is still used as an example, N=1. If the first phase difference is $\Delta\alpha_2$, after receiving the first information, the second device may directly use $\Delta\alpha_2$ to determine the optimal beam direction between the first device and the second device.

Optionally, if the first device is the access network device, and the second device is the UE, the UE may obtain reference signal received power (reference signal received power, RSRP) by measuring the M times of reference signals, and the UE may further send the RSRP to the access network device.

S603: The first device determines a second beam direction based on the first information. The second beam direction is the optimal beam direction between the first device and the second device.

For example, the first device may obtain $\Delta\alpha_2$ based on the first information, and the first device uses $\Delta\alpha_2$ as g(sin θ−sin β), and substitutes $\Delta\alpha_2$ into Formula 2. β is also a known quantity. For example, β is an angle of the first beam direction. In this case, the first device may determine θ according to Formula 2. In this way, an offset angle of the second beam direction relative to the first beam direction is determined, and therefore the second beam direction is determined. The second beam direction may be the same as or different from the first beam direction.

S604: The first device sends K times of reference signals to the second device in the first beam direction. Correspondingly, the second device receives the K times of reference signals from the first device in the first beam direction. The first device may determine the optimal beam direction between the first device and the second device by using the M times of reference signals. In the manner 0 or the manner 3 in Table 1, the second device used as the receive end of the reference signal may further determine the optimal beam direction between the second device and the first device by using the reference signal from the first device. Therefore, the first device may further send the K times of reference signals to the second device, and the second device may determine the optimal beam direction between the second device and the first device by using the K times of reference signals. Optionally, S604 and S601 may be a same step, that is, the first device may send the M times of reference signals and the K times of reference signals together. Alternatively, S604 may occur before or after S601. In FIG. 6, that S604 occurs after S601 is used as an example. If S604 occurs after S603, in S604, the first device may send the K times of reference signals to the second device in the second beam direction. Correspondingly, the second device receives the K times of reference signals from the first device in the second beam direction.

For example, each of the K times of reference signals may be sent through the two groups of transmit antennas of the first device, each time of reference signals may include two reference signals, and one group of transmit antennas send one of the reference signals. In other words, the first device simultaneously sends the reference signals through the two groups of transmit antennas each time, and sends the reference signals for K times in total. The optimal beam direction between the second device and the first device can be determined by using the K times of reference signals.

K is a positive integer. For example, K may be greater than or equal to 1. For example, the $M_1^{th}$ time of reference signals in the M times of reference signals may also be used to determine the optimal beam direction between the second device and the first device. In other words, the $M_1^{th}$ time of reference signals may be used as base signals. Therefore, K can only be greater than or equal to 1. Optionally, a value of K may be related to an antenna type of the second device, and the antenna type is, for example, a receive antenna type of the second device. For example, the second device may send receive antenna type information of the second device to the first device, so that the first device can determine the value of K based on the receive antenna type information.

For example, if the receive antenna type of the second device indicates that a receive antenna array of the second device is a linear array, K may be equal to 1 (or may be greater than 1), and the optimal beam direction between the second device and the first device may be determined through the process shown in FIG. 7. For another example, the receive antenna type of the second device indicates that a receive antenna array of the second device is a planar array. In this case, if an optimal beam direction between the second device and the first device in the horizontal direction or the vertical direction are to be determined by using the K times of reference signals, K may be equal to 1 (or may be greater than 1). Alternatively, if optimal beam directions between the second device and the first device in the horizontal direction and the vertical direction are to be determined by using the K times of reference signals, K may be greater than 2. For example, K may be equal to 2 (or may be greater than 3). The $M_1^{th}$ time of reference signals may be considered as the base reference signals. The base reference signals may be used when the optimal beam direction between the second device and the first device is determined in both the horizontal direction and the vertical direction. The two times of reference signals may be respectively used to determine the optimal beam direction between the second device and the first device in the horizontal direction and the optimal beam direction between the second device and the first device in the vertical direction. For example, the $M_1^{th}$ time of reference signals and the $1^{st}$ time of reference signals in the two times of reference signals are used to determine the optimal beam direction between the second device and the first device in the horizontal direction. The $M_1^{th}$ time of reference signals and the $2^{nd}$ time of reference signals in the two times of reference signals are used to determine the optimal beam direction between the second device and the first device in the vertical direction.

When the second device receives each of the K times of reference signals, quantities of receive antennas used in the two groups of receive antennas may be different. The difference herein is for each of the K times of reference signals. When each time of reference signals are received, the quantities of receive antennas used in the two groups of receive antennas are different, and when different times of reference signals are received, quantities of receive antennas used in a group of receive antennas may be the same or different.

Figure 8B:
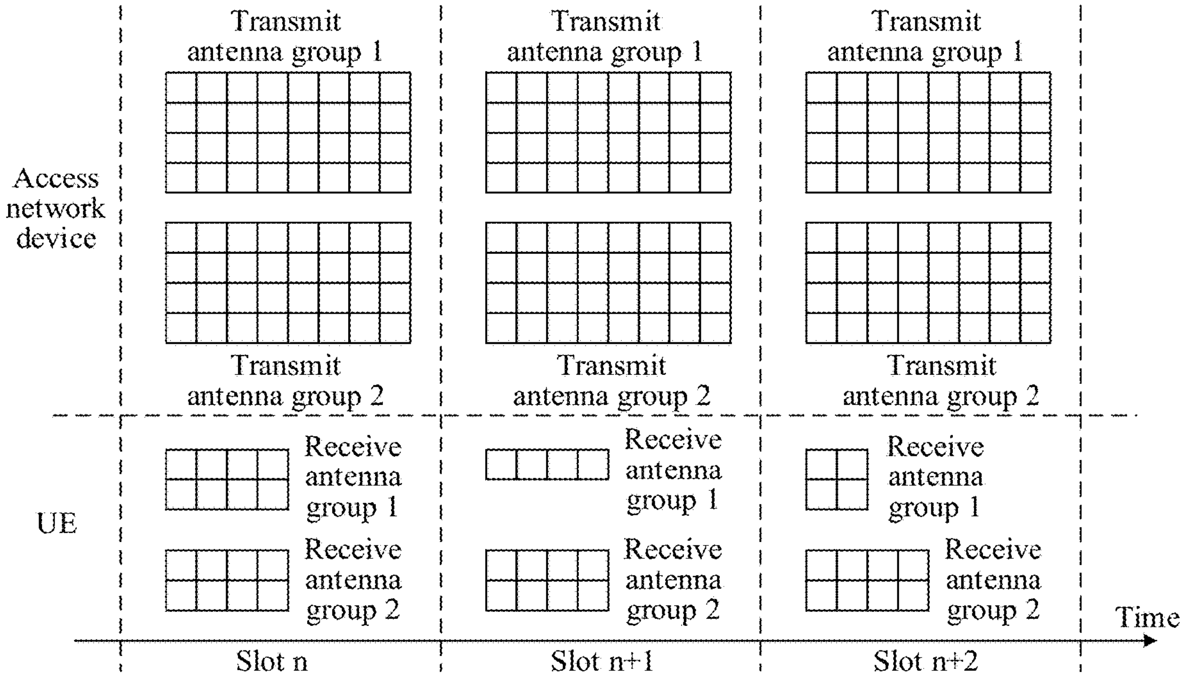
FIG. 8B is a diagram of using different receive antennas when a second device receives one time of reference signals according to an embodiment of this application.

FIG. 8B is a diagram of using different receive antennas when the second device receives one time of reference signals. In FIG. 8B, an example in which each group of receive antenna arrays of the second device is a 4*2 planar array, and the optimal beam directions in the horizontal direction and the vertical direction are to be determined is used. Therefore, K=2 is also used as an example. In FIG. 8B, the $1^{st}$ time of reference signals in three times of reference signals are the $M_1^{th}$ time of reference signals, and remaining two times of reference signals are the K times of reference signals. When the second device receives the $M_1^{th}$ time of reference signals (one time of reference signals corresponding to a slot n in FIG. 8B), quantities of receive antennas used in the two groups of receive antennas are the same, and respectively are, for example, total quantities of receive antennas in the two groups. When the $1^{st}$ time of reference signals in the K times of reference signals are received, a quantity of receive antennas used in one group of receive antennas is a total quantity of receive antennas included in the group of receive antennas, and a quantity of receive antennas used in the other group of receive antennas is a half of a total quantity of the group of receive antennas. When the $2^{nd}$ time of reference signals in the K times of reference signals are received, a quantity of receive antennas used in one group of receive antennas is a total quantity of receive antennas included in the group of receive antennas, and a quantity of receive antennas used in the other group of receive antennas is a half of a total quantity of the group of receive antennas. When the $1^{st}$ time of reference signals and the $2^{nd}$ time of reference signals are received, although the quantity of receive antennas used in the other group of receive antennas is the half of the total quantity of the group of receive antennas, specifically used receive antennas may be the same or different. In FIG. 8B, that different receive antennas are used is used as an example.

When the first device sends each of the K times of reference signals, quantities of transmit antennas used in the two groups of transmit antennas may be the same. For example, the first device uses all transmit antennas in each of the two groups of transmit antennas. If the total quantity of the two groups of transmit antennas is equal to the total quantity of transmit antennas of the first device, it is equivalent to a case in which the first device uses all transmit antennas to send each of the K times of reference signals. For example, in FIG. 8B, when the first device sends each of the three times of reference signals, quantities of transmit antennas used in the two groups of transmit antennas are the same. In FIG. 8B, an example in which each group of transmit antenna arrays of the first device is an 8*4 planar array is used.

Optionally, if the first device is the access network device, and the second device is the UE, the UE may obtain the RSRP by measuring the M times of reference signals, and the UE may send the RSRP to the access network device.

S605: The second device determines a fourth beam direction based on second information. The fourth beam direction is the optimal beam direction between the second device and the first device.

After receiving the K times of reference signals and the $M_1^{th}$ time of reference signals, the second device may determine, through measurement, receive phases of two reference signals included in each of the K times of reference signals and the $M_1^{th}$ time of reference signals, and may obtain the second information based on the determined receive phases. The second information may indicate receive phase information of the K times of reference signals, and optionally, may further indicate receive phase information of the $M_1^{th}$ time of reference signals.

Optionally, the second information may include receive phases of the K times of reference signals, or include receive phases of K+1 times of reference signals. If the receive phases of the K+1 times of reference signals are included, the second information may specifically include the receive phases of the K times of reference signals and receive phases of the $M_1^{th}$ time of reference signals.

Alternatively, the second information may include D fourth phase differences, where the fourth phase difference is a difference between the second phase difference and a fifth phase difference. D is a positive integer. The fifth phase difference is a phase difference between two reference signals included in one of the K times of reference signals. For descriptions of the second phase difference, refer to S602.

Alternatively, the second information may include K phase differences, or include K+1 phase differences. If the second information includes the K+1 phase differences, the first information may specifically include the K phase differences and the second phase difference. The K phase differences may be K fifth phase differences.

S605 may be implemented as follows: The second device determines an offset angle of the fourth beam direction relative to a current beam direction (for example, referred to as a beam direction A) between the second device and the first device based on the second information and the current beam direction between the second device and the first device, to determine the fourth beam direction.

For example, the second device may obtain $\Delta\alpha_2$ based on the first information, and the second device uses $\Delta\alpha_2$ as g(sin θ−sin β), and substitutes $\Delta\alpha_2$ into Formula 2. In addition, in Formula 2, $w(\beta)_t^T$ may be replaced with $w(\beta)_r^T$, and $\alpha(\theta)_t$ may be replaced with $\alpha(\theta_r$, where $w(\beta)_t^T$ may represent a receive beamforming vector of the second device, that is, a current receive beam of the second device, and $\alpha(\theta)_r$ represents a channel steering vector between the second device and the first device in a direction of θ. β is also a known quantity. For example, β is an angle of the beam direction A. In this case, the second device may determine θ according to Formula 2. In this way, the offset angle of the fourth beam direction relative to the beam direction A is determined, and therefore the fourth beam direction is determined.

Figure 9:
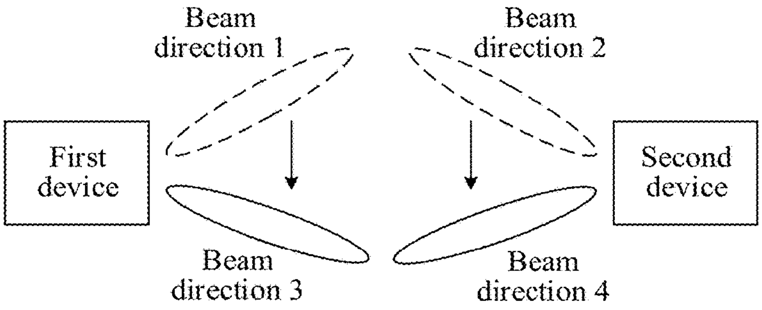
FIG. 9 is a diagram of beam directions before adjustment and beam directions after the adjustment according to an embodiment of this application.

For example, FIG. 9 is an example of beam directions before adjustment and beam directions after the adjustment. For example, the optimal beam direction between the first device and the second device is initially a beam direction 1 in FIG. 9, and the optimal beam direction between the second device and the first device is initially a beam direction 2 in FIG. 9. Subsequently, the second device moves. Therefore, the beam direction is re-determined according to the method provided in this embodiment of this application. In this case, a re-determined optimal beam direction between the first device and the second device is a beam direction 3 (for example, the second beam direction) in FIG. 9, and a re-determined optimal beam direction between the second device and the first device is a beam direction 4 (for example, the fourth beam direction) in FIG. 9.

The manner 0 or the manner 3 in Table 1 is implemented according to the technical solutions in this embodiment of this application. A new method for determining a beam direction between two devices is proposed in this embodiment of this application. In the method, a phase is used to calibrate the beam direction between the two devices. Because the phase is used for the calibration, a small quantity of times (or a small quantity) of reference signals may be used. For example, when M is greater than or equal to 2, and K is greater than or equal to 1, the beam direction of the first device and the beam direction of the second device are calibrated. In addition, the first device may only send the reference signal in an original beam direction (for example, the first beam direction), and does not send the reference signal in a plurality of beam directions (if the optimal beam direction is determined by using the RSRP, the transmit end sends a large quantity of reference signals in the plurality of beam directions). This can simplify implementation of the first device. It can be learned that because the new method for determining the beam direction is used, the first device can calibrate the beam direction without sending excessive times of reference signals or changing a sending direction of the reference signal. Therefore, according to the technical solutions provided in this embodiment of this application, transmission overheads caused by the beam tracking can be reduced, and a reference signal sending process of the first device can be simplified.

Figure 10:
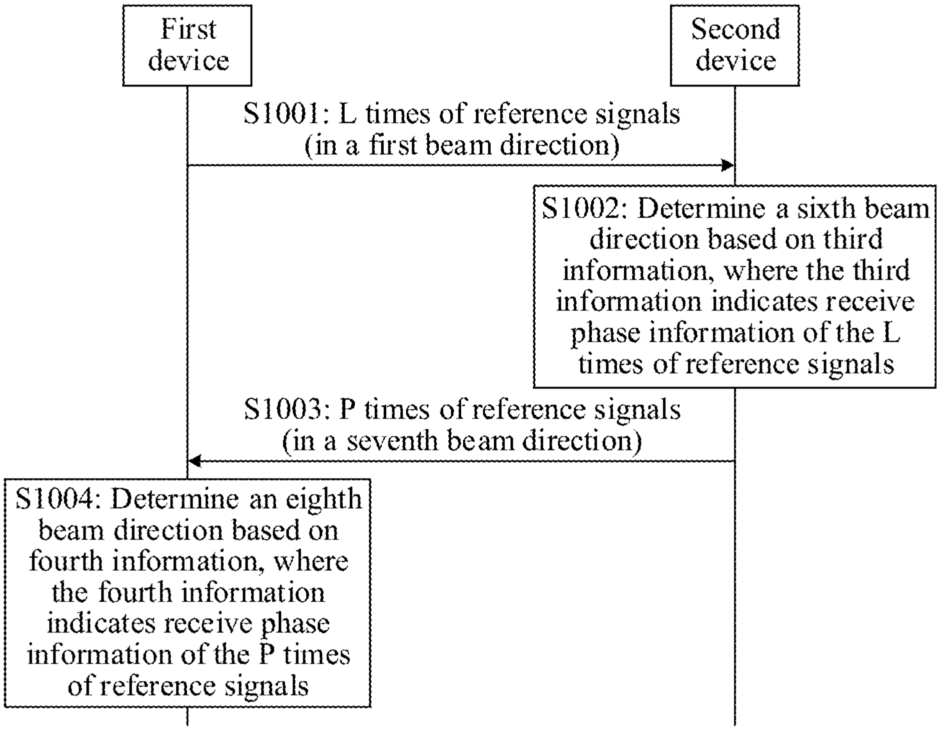
FIG. 10 is a flowchart of a second communication method according to an embodiment of this application.

An embodiment of this application provides a second communication method. For example, the manner 1 in Table 1 is implemented in the method. FIG. 10 is a flowchart of the method. The method may be applied to the network architecture shown in FIG. 3. For example, a first device in the method is the first device in FIG. 3, and a second device in the method is the second device in FIG. 3.

S1001: The first device sends L times of reference signals to the second device in a first beam direction. Correspondingly, the second device receives the L times of reference signals from the first device in the first beam direction. The first beam direction is a current beam direction in which the first device sends information to the second device, or is a current beam direction in which the first device receives information from the second device. For example, the first device is an access network device, the second device is UE, and the reference signal is, for example, a CSI-RS or an SSB. For another example, the first device is UE, the second device is an access network device, and the reference signal is, for example, an SRS.

For example, each of the L times of reference signals may be sent through two groups of transmit antennas of the first device, each time of reference signals may include two reference signals, and one group of transmit antennas send one of the reference signals. In other words, the first device simultaneously sends the reference signals through the two groups of transmit antennas each time, and sends the reference signals for L times in total. An optimal beam direction between the second device and the first device can be determined by using the L times of reference signals.

L is a positive integer. For example, L may be greater than or equal to 2. Optionally, a value of L may be related to an antenna type of the second device, and the antenna type is, for example, a receive antenna type of the second device. The second device may send receive antenna type information of the second device to the first device, so that the first device can determine the value of L based on the receive antenna type information. For example, if the receive antenna type of the second device indicates that a receive antenna array of the second device is a linear array, L may be equal to 2 (or may be greater than 2). Alternatively, if the receive antenna type of the second device indicates that a receive antenna array of the second device is a planar array, L may be greater than or equal to 2. For descriptions of this, refer to the descriptions of the M times of reference signals in S601 in the embodiment shown in FIG. 6.

When the first device sends each of the L times of reference signals, quantities of transmit antennas used in the two groups of transmit antennas may be the same. For example, the first device uses all transmit antennas in each of the two groups of transmit antennas. If a total quantity of the two groups of transmit antennas is equal to a total quantity of transmit antennas of the first device, it is equivalent to a case in which the first device uses all transmit antennas to send each of the L times of reference signals.

The second device may include two groups of receive antennas, and the two groups of receive antennas may include a same quantity of antennas. For example, a total quantity of receive antennas included in the two groups of receive antennas is equal to a total quantity of receive antennas included in the second device. The second device may use the two groups of receive antennas when receiving each of the L times of reference signals. The two groups of receive antennas may be configured to receive the reference signals sent by the two groups of transmit antennas of the first device. In this case, the two groups of receive antennas of the second device may receive two reference signals at a time, and each group of receive antennas receive one of the reference signals. For example, the reference signal sent by one group of transmit antennas of the first device is received by one group of receive antennas of the second device.

When the second device receives one of the L times of reference signals, quantities of receive antennas used in the two groups of receive antennas may be the same. For example, when receiving this time of reference signals, the second device uses all receive antennas in each of the two groups of receive antennas. If the total quantity of the two groups of receive antennas is equal to the total quantity of receive antennas of the second device, it is equivalent to a case in which the second device uses all receive antennas to receive this time of reference signals. For example, this time of reference signals are referred to as an $L_1^{th}$ time of reference signals. A receiving sequence (or a location of the $L_1^{th}$ time of reference signals in the L times of reference signals in a receiving process) of the $L_1^{th}$ time of reference signals is not limited. For example, the receiving sequence of the $L_1^{th}$ time of reference signals may be before L−1 times of reference signals, after L−1 times of reference signals, or during L−1 times of reference signals. That the receiving sequence of the $L_1^{th}$ time of reference signals is during the L−1 times of reference signals means that a previous time of reference signals of the $L_1^{th}$ time of reference signals are one of the L−1 times of reference signals, and a next time of reference signals of the $L_1^{th}$ time of reference signals are also one of the L−1 times of reference signals. The L−1 times of reference signals are remaining reference signals other than the $L_1^{th}$ time of reference signals in the L times of reference signals. The receiving sequence of the $L_1^{th}$ time of reference signals may be negotiated by the first device and the second device in advance, may be determined by the first device and then notified to the second device, or may be determined by the second device and then indicated to the first device. In other words, both the first device and the second device can determine the receiving sequence of the $L_1^{th}$ time of reference signals. The $L_1^{th}$ time of reference signals may be considered as base reference signals. In embodiments of this application, a sending sequence of a signal and a receiving sequence of the signal may be a same sequence.

When the second device receives each of the L−1 times of reference signals, quantities of receive antennas used in the two groups of receive antennas may be different. The difference herein is for each of the L−1 times of reference signals. When each time of reference signals are received, the quantities of receive antennas used in the two groups of receive antennas are different, and when different times of reference signals are received, quantities of receive antennas used in a group of receive antennas may be the same or different.

Optionally, if the first device is the access network device, and the second device is the UE, the UE may obtain RSRP by measuring the L times of reference signals, and the UE may send the RSRP to the access network device.

S1002: The second device determines a sixth beam direction based on third information. The sixth beam direction is the optimal beam direction between the second device and the first device.

After receiving the L times of reference signals, the second device may determine, through measurement, receive phases of two reference signals included in each of the L times of reference signals, and may obtain the third information based on the determined receive phases. The third information may indicate receive phase information of the L times of reference signals.

Optionally, the third information may include receive phases of the L times of reference signals.

Alternatively, the third information may include L phase differences. The L phase differences may include a sixth phase difference and a seventh phase difference. The sixth phase difference is a phase difference between two reference signals included in the $L_1^{th}$ time of reference signals, and the seventh phase difference is a phase difference between two reference signals included in one of the L−1 times of reference signals.

Alternatively, the third information may include $A_1$ eighth phase differences, where the eighth phase difference is a difference between the seventh phase difference and the sixth phase difference. $A_1$ is a positive integer. For example, $A_1$ is less than L.

For more content of determining the sixth beam direction by the second device based on the third information, refer to S605 in the embodiment shown in FIG. 6.

S1003: The second device sends P times of reference signals to the first device in a seventh beam direction. Correspondingly, the first device receives the P times of reference signals from the second device in the seventh beam direction. The seventh beam direction is a current beam direction in which the second device sends information to the first device, or is a current beam direction in which the second device receives information from the first device. For example, the second device is the access network device, the first device is the UE, and the reference signal is, for example, a CSI-RS or an SSB. For another example, the second device is the UE, the first device is the access network device, and the reference signal is, for example, an SRS.

S1003 may occur before or after S1002. If S1003 occurs before S1002, the seventh beam direction and the sixth beam direction are a same beam direction or different beam directions. Alternatively, if S1003 occurs after S1002, the seventh beam direction and the sixth beam direction may be a same beam direction.

For example, each of the P times of reference signals may be sent through two groups of transmit antennas of the second device, each time of reference signals may include two reference signals, and one group of transmit antennas send one of the reference signals. In other words, the second device simultaneously sends the reference signals through the two groups of transmit antennas each time, and sends the reference signals for P times in total. An optimal beam direction between the first device and the second device can be determined by using the P times of reference signals.

P is a positive integer. For example, P may be greater than or equal to 2. Optionally, a value of P may be related to an antenna type of the first device, and the antenna type is, for example, a receive antenna type of the first device. The first device may send receive antenna type information of the first device to the second device, so that the second device can determine the value of P based on the receive antenna type information. For example, if the receive antenna type of the first device indicates that a receive antenna array of the first device is a linear array, P may be equal to 2 (or may be greater than 2). Alternatively, if the receive antenna type of the first device indicates that a receive antenna array of the first device is a planar array, P may be greater than or equal to 2. For descriptions of this, refer to the descriptions of the M times of reference signals in S601 in the embodiment shown in FIG. 6.

When the second device sends each of the P times of reference signals, quantities of transmit antennas used in the two groups of transmit antennas may be the same. For example, the second device uses all transmit antennas in each of the two groups of transmit antennas. If a total quantity of the two groups of transmit antennas is equal to a total quantity of transmit antennas of the second device, it is equivalent to a case in which the second device uses all transmit antennas to send each of the P times of reference signals.

The first device may include two groups of receive antennas, and the two groups of receive antennas may include a same quantity of antennas. For example, a total quantity of receive antennas included in the two groups of receive antennas is equal to a total quantity of receive antennas included in the first device. The first device may use the two groups of receive antennas when receiving each of the P times of reference signals. The two groups of receive antennas may be configured to receive the reference signals sent by the two groups of transmit antennas of the second device. In this case, the two groups of receive antennas of the first device may receive two reference signals at a time, and each group of receive antennas receive one of the reference signals. For example, the reference signal sent by one group of transmit antennas of the second device is received by one group of receive antennas of the first device.

When the first device receives one of the P times of reference signals, quantities of receive antennas used in the two groups of receive antennas may be the same. For example, when receiving this time of reference signals, the first device uses all receive antennas in each of the two groups of receive antennas. If the total quantity of the two groups of receive antennas is equal to the total quantity of receive antennas of the first device, it is equivalent to a case in which the first device uses all receive antennas to receive this time of reference signals. For example, this time of reference signals are referred to as an $P_1^{th}$ time of reference signals. A receiving sequence (or a location of the $P_1^{th}$ time of reference signals in the P times of reference signals in a receiving process) of the $P_1^{th}$ time of reference signals is not limited. For example, the receiving sequence of the $P_1^{th}$ time of reference signals may be before P−1 times of reference signals, after P−1 times of reference signals, or during P−1 times of reference signals. That the receiving sequence of the $P_1^{th}$ time of reference signals is during the P−1 times of reference signals means that a previous time of reference signals of the $P_1^{th}$ time of reference signals are one of the P−1 times of reference signals, and a next time of reference signals of the $P_1^{th}$ time of reference signals are also one of the P−1 times of reference signals. The P−1 times of reference signals are remaining reference signals other than the $P_1^{th}$ time of reference signals in the P times of reference signals. The receiving sequence of the $P_1^{th}$ time of reference signals may be negotiated by the first device and the second device in advance, may be determined by the second device and then notified to the first device, or may be determined by the first device and then indicated to the second device. In other words, both the first device and the second device can determine the receiving sequence of the $P_1^{th}$ time of reference signals. The $P_1^{th}$ time of reference signals may be considered as base reference signals.

When the first device receives each of the P−1 times of reference signals, quantities of receive antennas used in the two groups of receive antennas may be different. The difference herein is for each of the P−1 times of reference signals. When each time of reference signals are received, the quantities of receive antennas used in the two groups of receive antennas are different, and when different times of reference signals are received, quantities of receive antennas used in a group of receive antennas may be the same or different.

Optionally, if the second device is the access network device, and the first device is the UE, the UE may obtain RSRP by measuring the P times of reference signals, and the UE may send the RSRP to the access network device.

S1004: The first device determines an eighth beam direction based on fourth information. The eighth beam direction is the optimal beam direction between the first device and the second device.

After receiving the P times of reference signals, the first device may determine, through measurement, receive phases of two reference signals included in each of the P times of reference signals, and may obtain the fourth information based on the determined receive phases. The fourth information may indicate receive phase information of the P times of reference signals.

Optionally, the fourth information may include receive phases of the P times of reference signals.

Alternatively, the fourth information may include P phase differences. The P phase differences may include a ninth phase difference and a tenth phase difference. The ninth phase difference is a phase difference between two reference signals included in the $P_1^{th}$ time of reference signals, and the tenth phase difference is a phase difference between two reference signals included in one of the P−1 times of reference signals.

Alternatively, the fourth information may include $A_2$ eleventh phase differences, where the eleventh phase difference is a difference between the ninth phase difference and the tenth phase difference. $A_2$ is a positive integer. For example, $A_2$ is less than P.

For more content of determining the eighth beam direction by the first device based on the fourth information, refer to S605 in the embodiment shown in FIG. 6.

The manner 1 in Table 1 is implemented according to the technical solutions in this embodiment of this application. A new method for determining a beam direction between two devices is proposed in this embodiment of this application. In the method, a phase is used to calibrate the beam direction between the two devices. Because the phase is used for the calibration, a small quantity of times or a small quantity of reference signals may be used. For example, when L is greater than or equal to 2, and P is greater than or equal to 2, the beam direction of the first device and the beam direction of the second device are calibrated. In addition, a transmit end of a reference signal only sends the reference signal in an original beam direction, and does not send the reference signal in a plurality of beam directions. This can simplify implementation of the device. It can be learned that because the new method for determining the beam direction is used, both the first device and the second device can calibrate the beam direction without sending excessive times of reference signals. Therefore, according to the technical solutions provided in this embodiment of this application, transmission overheads caused by beam tracking can be reduced.

Figure 11:
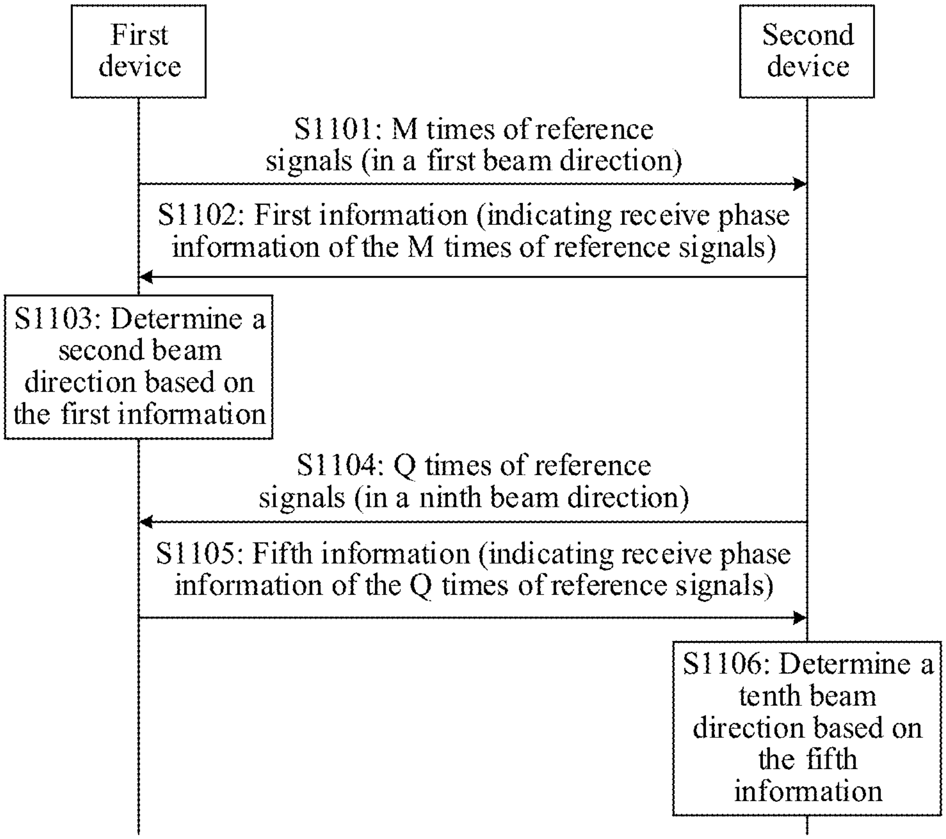
FIG. 11 is a flowchart of a third communication method according to an embodiment of this application.

An embodiment of this application provides a third communication method. For example, the manner 2 in Table 1 is implemented in the method. FIG. 11 is a flowchart of the method. The method may be applied to the network architecture shown in FIG. 3. For example, a first device in the method is the first device in FIG. 3, and a second device in the method is the second device in FIG. 3.

S1101: The first device sends M times of reference signals to the second device in a first beam direction. Correspondingly, the second device receives the M times of reference signals from the first device in the first beam direction.

For more content of S1001, refer to S601 in the embodiment shown in FIG. 6.

S1102: The second device sends first information to the first device. Correspondingly, the first device receives the first information from the second device.

For more content of S1102, refer to S602 in the embodiment shown in FIG. 6.

S1103: The first device determines a second beam direction based on the first information. The second beam direction is an optimal beam direction between the first device and the second device.

For more content of S1103, refer to S603 in the embodiment shown in FIG. 6.

S1104: The second device sends Q times of reference signals to the first device in a ninth beam direction. Correspondingly, the first device receives the Q times of reference signals from the second device in the ninth beam direction. The ninth beam direction is a current beam direction in which the second device sends information to the first device, or is a current beam direction in which the second device receives information from the first device.

For example, each of the Q times of reference signals may be sent through two groups of transmit antennas of the second device, each time of reference signals may include two reference signals, and one group of transmit antennas send one of the reference signals. In other words, the second device simultaneously sends the reference signals through the two groups of transmit antennas each time, and sends the reference signals for Q times in total. An optimal beam direction between the second device and the first device can be determined by using the Q times of reference signals.

Q is a positive integer. For example, Q may be greater than or equal to 2. Optionally, a value of Q may be related to an antenna type of the second device, and the antenna type is, for example, a transmit antenna type of the second device. For example, if the transmit antenna type of the second device indicates that a transmit antenna array of the second device is a linear array, Q may be equal to 2 (or may be greater than 2). Alternatively, if the transmit antenna type of the second device indicates that a transmit antenna array of the second device is a planar array, each transmit antenna of the second device may be considered as including two transmit channels in a horizontal direction and a vertical direction, and Q may be greater than or equal to 2.

When one of the Q times of reference signals are sent, quantities of transmit antennas used by the second device in the two groups of transmit antennas may be the same. For example, this time of reference signals are referred to as a $Q_1^{th}$ time of reference signals. In addition to the $Q_1^{th}$ time of reference signals, the Q times of reference signals further include Q−1 times of reference signals. When the second device sends each of the Q−1 times of reference signals, quantities of transmit antennas used in the two groups of transmit antennas may be different. When the first device receives each of the Q times of reference signals, quantities of receive antennas used in two groups of receive antennas may be the same.

For more content of S1004, refer to S601 in the embodiment shown in FIG. 6. During reference, M in S601 may be replaced with Q, the first device may be replaced with the second device, and the second device may be replaced with the first device.

S1105: The first device sends fifth information to the second device. Correspondingly, the second device receives the fifth information from the first device.

After receiving the Q times of reference signals, the first device may determine, through measurement, receive phases of two reference signals included in each of the Q times of reference signals, and may obtain the fifth information based on the determined receive phases. The fifth information may indicate receive phase information of the Q times of reference signals.

Optionally, the fifth information may include receive phases of the Q times of reference signals.

Alternatively, the fifth information may include Q phase differences, where the Q phase differences may include a twelfth phase difference and a thirteenth phase difference. The twelfth phase difference is a phase difference between two reference signals included in the $Q_1^{th}$ time of reference signals, and the thirteenth phase difference is a phase difference between two reference signals included in one of the Q−1 times of reference signals.

Alternatively, the fifth information may include $A_3$ fourteenth phase differences, where $A_3$ is a positive integer. For example, $A_3$ is less than M. One of the $A_3$ fourteenth phase differences is, for example, a difference between the thirteenth phase difference and the twelfth phase difference.

For more content of S1105, refer to S602 in the embodiment shown in FIG. 6. During reference, Min S601 may be replaced with Q, the first device may be replaced with the second device, the second device may be replaced with the first device, and the first information may be replaced with the fifth information.

S1106: The second device determines a tenth beam direction based on the fifth information. The tenth beam direction is the optimal beam direction between the second device and the first device. The tenth beam direction may be the same as or different from the ninth beam direction.

For more content of S1105, refer to S603 in the embodiment shown in FIG. 6. During reference, the first beam direction in S603 may be replaced with the ninth beam direction, the first information may be replaced with the fifth information, the first device may be replaced with the second device, and the second device may be replaced with the first device.

The manner 2 in Table 1 is implemented according to the technical solutions in this embodiment of this application. A new method for determining a beam direction between two devices is proposed in this embodiment of this application. In the method, a phase is used to calibrate the beam direction between the two devices. Because the phase is used for the calibration, a small quantity of times (or a small quantity) of reference signals may be used. For example, when M is greater than or equal to 2, and Q is greater than or equal to 2, the beam direction of the first device and the beam direction of the second device are calibrated. In addition, a transmit end of a reference signal only sends the reference signal in an original beam direction, and does not send the reference signal in a plurality of beam directions. This can simplify implementation of the device. It can be learned that because the new method for determining the beam direction is used, both the first device and the second device can calibrate the beam direction without sending excessive times of reference signals. Therefore, according to the technical solutions provided in this embodiment of this application, transmission overheads caused by beam tracking can be reduced.

Figure 12:
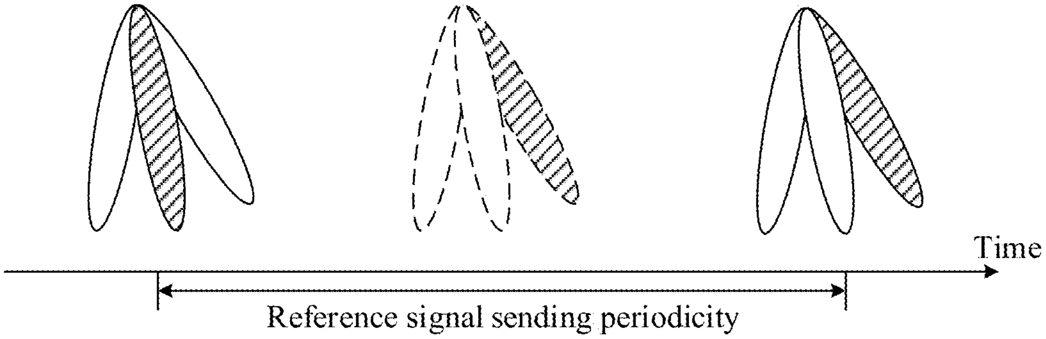
FIG. 12 is a diagram of an excessively long reference signal sending periodicity.

Next, refer to FIG. 12. FIG. 12 shows one reference signal sending periodicity. An optimal beam direction is switched before a next reference signal sending periodicity arrives (beams drawn with slashes in FIG. 12 represent optimal beams, where it can be learned that because the reference signal sending periodicity is excessively long, when a previous reference signal sending periodicity has ended, but the next reference signal sending periodicity has not arrived, the optimal beam direction is switched, in other words, the optimal beam is switched). However, UE can determine, by measuring a CSI-RS, that the optimal beam direction is switched only when the next reference signal sending periodicity arrives. As a result, the UE cannot sense the optimal beam direction switching in a timely manner, and therefore cannot adjust the beam direction in a timely manner. Consequently, received power of the UE decreases.

Figure 13:
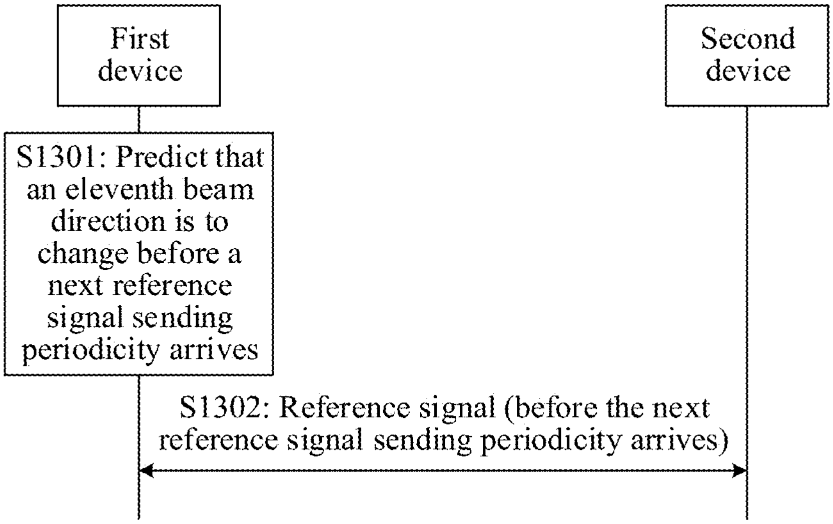
FIG. 13 is a flowchart of a fourth communication method according to an embodiment of this application.

In view of this, an embodiment of this application provides a fourth communication method. According to the method, whether an optimal beam direction is switched can be determined in a timely manner, to increase received power of a receive end. FIG. 13 is a flowchart of the method.

S1301: A first device predicts that an eleventh beam direction is to change before a next reference signal sending periodicity arrives. Alternatively, the first device predicts that the optimal beam direction is to change before a next reference signal sending periodicity arrives. For example, the first device is an access network device, and a second device is UE; or the first device is UE, and a second device is an access network device.

The reference signal sending periodicity may include a periodicity in which the first device sends a reference signal, and/or include a periodicity in which the second device sends a reference signal. The eleventh beam direction is, for example, an optimal beam direction between the first device and the second device, or an optimal beam direction between the second device and the first device. For example, if the technical solutions in this embodiment of this application are combined with the embodiment shown in FIG. 6, the eleventh beam direction is, for example, the second beam direction or the fourth beam direction.

For example, the first device performs prediction based on phase offset information (or referred to as beam direction switching information, optimal beam direction switching information, or the like). The phase offset information may indicate a historical phase offset of the eleventh beam direction (or indicate a historical phase offset of the optimal beam direction; or indicate historical switching of the optimal beam direction). The first device may determine, based on the phase offset information, a rule of the phase offset of the eleventh beam direction, so that the first device may predict, according to the rule, a status of a phase offset that is to occur in the eleventh beam direction. The phase offset information may include time at which the phase offset occurs in the eleventh beam direction, but does not include a phase offset angle. Alternatively, the phase offset information may include time at which the phase offset occurs in the eleventh beam direction and a corresponding phase offset angle.

For example, the phase offset information indicates that the phase offset occurs in the eleventh beam direction at a moment T1, a moment T2, and a moment T3. A time interval between the moment T1 and the moment T2 is T, and a time interval between the moment T2 and the moment T3 is also T. In this case, the rule of the phase offset of the eleventh beam direction may be that the phase offset occurs in the eleventh beam direction based on the periodicity T. In this case, the first device may predict, according to the rule, that the phase offset may occur in the eleventh beam direction at a moment T4, and a time interval between the moment T4 and the moment T3 is T.

The phase offset information may be obtained by the first device by itself. For example, the first device may store phase offset information of an optimal beam since the first device runs, or the first device may start to store phase offset information of an optimal beam at a start moment when the first device is started or restarted. Alternatively, the phase offset information may be sent by the second device to the first device. For example, the second device may store phase offset information of an optimal beam within a period of time, and send the phase offset information to the first device.

S1302: The first device sends or receives a reference signal before the next reference signal sending periodicity arrives. Correspondingly, the second device receives or sends the reference signal. The reference signal may be used to determine direction information, or used to determine the optimal beam.

For example, the first device predicts, based on the phase offset information, that the phase offset is to occur in the eleventh beam direction at the moment T4. However, at the moment T4, a previous reference signal sending periodicity has ended, but the next reference signal sending periodicity has not arrived. In other words, if the reference signal is sent based on the reference signal sending periodicity, no reference signal is sent at the moment T4, and the first device or the second device cannot determine the phase offset status of the eleventh beam direction based on the reference signal. If the phase offset actually occurs in the eleventh beam direction at the moment T4, the first device or the second device can determine, only when the next reference signal sending periodicity arrives, the result by measuring the reference signal. During this period, received power of the first device or the second device decreases.

Therefore, in this embodiment of this application, if a moment (for example, the moment T4) at which the eleventh beam direction changes and that is predicted by the first device is before time when the next reference signal sending periodicity arrives and after time when the previous reference signal sending periodicity ends, the first device may trigger the reference signal in a timely manner after obtaining a prediction result. For example, the first device may send the reference signal at the moment T4, or the first device may send the reference signal within a first time range, where the first time range includes first duration before the moment T4 and/or second duration after the moment T4.

In this embodiment of this application, the first device and/or the second device may determine, according to a beam tracking manner, whether the eleventh beam direction is offset. For example, the first device sends the reference signal, and the second device measures the reference signal, and determines the optimal beam direction between the second device and the first device based on RSRP obtained through measurement. Alternatively, the first device indicates the second device to send a reference signal. After receiving the reference signal, the first device may measure the reference signal, and determine the optimal beam direction between the first device and the second device based on RSRP obtained through measurement. For example, the optimal beam direction between the first device and the second device is referred to as a third beam direction, and the optimal beam direction between the second device and the first device is referred to as a fifth beam direction.

Alternatively, the first device and/or the second device may determine, according to the beam tracking manner provided in embodiments of this application, whether the eleventh beam direction is offset. For example, whether the eleventh beam direction is offset may be determined according to the method described in any one or more embodiments in FIG. 6, FIG. 10, or FIG. 11.

For example, if the eleventh beam direction is a beam direction between the first device and the second device, the first device may send H times of reference signals, and the second device may receive the H times of reference signals from the first device, and send measured receive phase information to the first device, so that the first device may determine the third beam direction based on the receive phase information. For example, the second device is the UE, and the first device is the access network device. The UE may send the receive phase information through a physical uplink shared channel (PUSCH) jointly indicated by downlink control information (DCI) and radio resource control (RRC) signaling.

Alternatively, the first device may indicate the second device to send the reference signal. For example, after receiving an indication from the first device, the second device may send H times of reference signals, and the first device may receive the H times of reference signals from the second device, so that the first device may determine the third beam direction based on receive phase information obtained through measurement.

For another example, if the eleventh beam direction is a beam direction between the second device and the first device, the first device may send H times of reference signals, and the second device may receive the H times of reference signals from the first device, so that the second device may determine the optimal beam direction between the second device and the first device based on receive phase information obtained through measurement. For example, the optimal beam direction between the second device and the first device is referred to as the fifth beam direction.

Alternatively, the first device may indicate the second device to send the reference signal. For example, after receiving an indication from the first device, the second device may send H times of reference signals, and the first device may receive the H times of reference signals from the second device, and send measured receive phase information to the second device, so that the second device may determine the fifth beam direction based on the receive phase information.

Each of the H times of reference signals may include two reference signals, and transmission may be performed on the two reference signals through two groups of transmit antennas and two groups of receive antennas. For content such as how the first device or the second device determines the third beam direction or the fifth beam direction and an implementation form of the reference signal, refer to the descriptions of any one or more embodiments in FIG. 6, FIG. 10, or FIG. 11.

In the foregoing steps, an example in which the first device performs prediction is used. Alternatively, the second device may perform prediction. For example, steps performed by the "first device" and the "second device" in this embodiment of this application may alternatively be interchanged. This is flexible.

In this embodiment of this application, a scenario in which optimal beam switching may occur before the next reference signal sending periodicity arrives is considered. If the first device or the second device predicts that the optimal beam switching exists, and is before the next reference signal sending periodicity arrives, aperiodic reference signal measurement is triggered, so that the optimal beam can be adjusted in a timely manner, to increase received power on a link.

This embodiment of this application may be applied in combination with any one or more embodiments in FIG. 6, FIG. 10, or FIG. 11. For example, in any one or more embodiments in FIG. 6, FIG. 10, or FIG. 11, the reference signal is sent based on the reference signal sending periodicity. In this process, this embodiment of this application may be performed. Alternatively, this embodiment of this application is not combined with the embodiments shown in FIG. 6, FIG. 10, and FIG. 11, but is separately applied.

Figure 14:
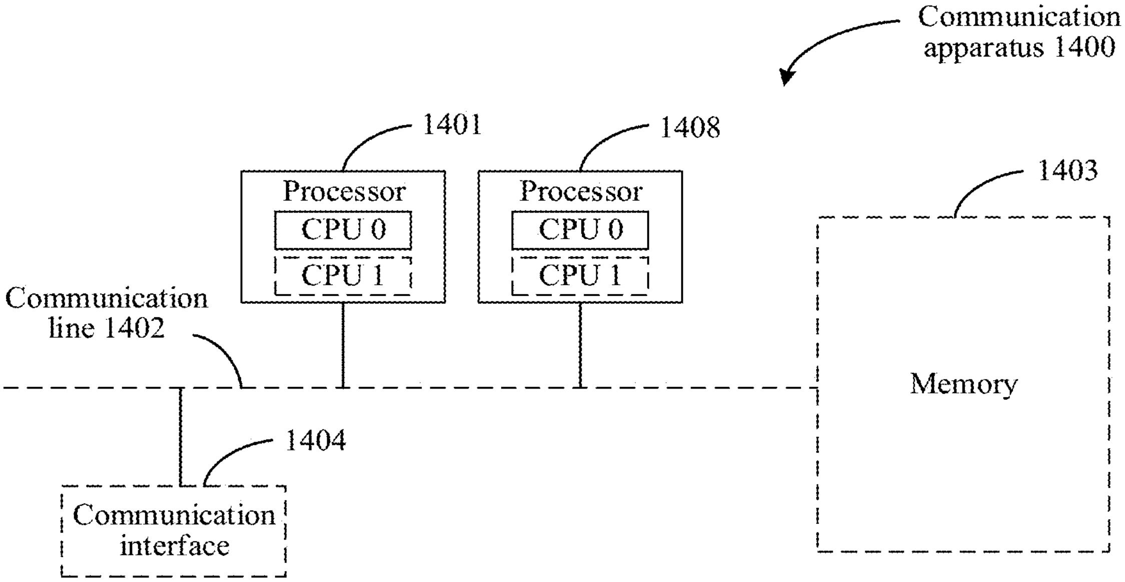
FIG. 14 is a diagram of an apparatus according to an embodiment of this application.

FIG. 14 is a diagram of a structure of a communication apparatus according to an embodiment of this application. The communication apparatus 1400 may be the first device or a circuit system of the first device according to any embodiment in FIG. 6, FIG. 10, FIG. 11, or FIG. 13, and is configured to implement the method corresponding to the first device in the foregoing method embodiments. Alternatively, the communication apparatus 1400 may be the second device or a circuit system of the second device according to any embodiment in FIG. 6, FIG. 10, FIG. 11, or FIG. 13, and is configured to implement the method corresponding to the second device in the foregoing method embodiments. For a specific function, refer to the descriptions in the foregoing method embodiments. For example, a circuit system is a chip system.

The communication apparatus 1400 includes at least one processor 1401. The processor 1401 may be configured for internal processing of the apparatus, to implement a specific control processing function. Optionally, the processor 1401 includes instructions. Optionally, the processor 1401 may store data. Optionally, different processors may be independent devices, and may be located at different physical locations, or may be located on different integrated circuits. Optionally, different processors may be integrated into one or more processors, for example, integrated into one or more integrated circuits.

Optionally, the communication apparatus 1400 includes one or more memories 1403, configured to store instructions. Optionally, the memory 1403 may further store data. The processor and the memory may be separately disposed, or may be integrated together.

Optionally, the communication apparatus 1400 includes a communication line 1402 and at least one communication interface 1404. Because the memory 1403, the communication line 1402, and the communication interface 1404 are all optional, the memory 1403, the communication line 1402, and the communication interface 1404 are all represented by dashed lines in FIG. 14.

Optionally, the communication apparatus 1400 may further include a transceiver machine and/or an antenna. The transceiver machine may be configured to send information to another apparatus or receive information from another apparatus. The transceiver machine may be referred to as a transceiver, a transceiver circuit, an input/output interface, or the like, and is configured to implement a transceiver function of the communication apparatus 1400 through the antenna. The antenna includes, for example, a transmit antenna and a receive antenna, or one antenna may be used as both a transmit antenna and a receive antenna. Optionally, the transceiver machine includes a transmitter and a receiver. For example, the transmitter may be configured to generate a radio frequency signal based on a baseband signal, and the receiver may be configured to convert the radio frequency signal into a baseband signal.

The processor 1401 may include a general-purpose central processing unit (CPU), a microprocessor, an application-specific integrated circuit (ASIC), or one or more integrated circuits configured to control program execution of the solutions in embodiments of this application.

The communication line 1402 may include a path for information transmission between the foregoing components.

The communication interface 1404 is any apparatus like a transceiver machine, and is configured to communicate with another device or a communication network, for example, Ethernet, a radio access network (RAN), a wireless local area network (WLAN), or a wired access network.

The memory 1403 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or data structure and that can be accessed by a computer, but is not limited thereto. The memory 1403 may exist independently, and is connected to the processor 1401 through the communication line 1402. Alternatively, the memory 1403 may be integrated with the processor 1401.

The memory 1403 is configured to store computer-executable instructions for performing the solutions in embodiments of this application, and the processor 1401 controls execution. The processor 1401 is configured to execute the computer-executable instructions stored in the memory 1403, to implement the communication methods provided in the foregoing embodiments of this application.

Optionally, the computer-executable instructions in this embodiment of this application may also be referred to as application program code. This is not specifically limited in this embodiment of this application.

During specific implementation, in an embodiment, the processor 1401 may include one or more CPUs such as a CPU 0 and a CPU 1 in FIG. 14.

During specific implementation, in an embodiment, the communication apparatus 1400 may include a plurality of processors such as the processor 1401 and a processor 1408 in FIG. 14. Each of the processors may be a single-core (single-CPU) processor or a multi-core (multi-CPU) processor. Herein, the processor may be one or more devices, circuits, and/or processing cores configured to process data (for example, computer program instructions).

When the apparatus shown in FIG. 14 is a chip, for example, a chip in the first device or a chip in the second device, the chip includes a processor 1401 (which may further include a processor 1408), a communication line 1402, a memory 1403, and a communication interface 1404. Specifically, the communication interface 1404 may be an input interface, a pin, a circuit, or the like. The memory 1403 may be a register, a cache, or the like. The processor 1401 and the processor 1408 each may be a general-purpose CPU, a microprocessor, an ASIC, or one or more integrated circuits configured to control program execution of the communication method in any one of the foregoing embodiments.

Figure 15:
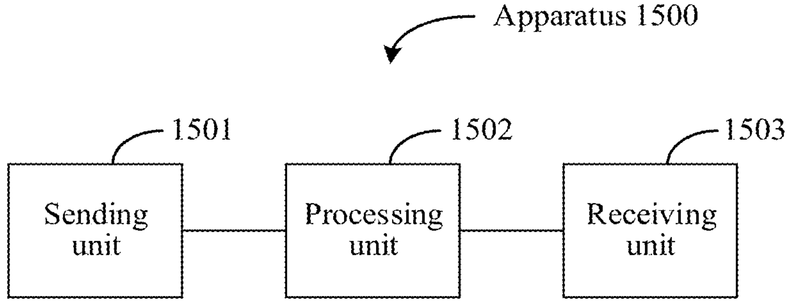
FIG. 15 is a diagram of another apparatus according to an embodiment of this application.

In embodiments of this application, division into functional modules may be performed on the apparatus based on the foregoing method examples. For example, division into functional modules may be performed based on corresponding functions, or two or more functions may be integrated into one processing module. The integrated module may be implemented in a form of hardware, or may be implemented in a form of a software functional module. It should be noted that, in embodiments of this application, division into the modules is an example, and is only logical function division. During actual implementation, another division manner may be used. For example, when division into functional modules is performed based on corresponding functions, FIG. 15 is a diagram of an apparatus. The apparatus 1500 may be the first device or the second device in the foregoing method embodiments, or a chip in the first device or a chip in the second device. The apparatus 1500 includes a sending unit 1501, a processing unit 1502, and a receiving unit 1503.

It should be understood that the apparatus 1500 may be configured to implement steps performed by the first device or the second device in the methods in embodiments of this application. For related features, refer to the foregoing embodiments. Details are not described herein again.

Optionally, functions/implementation processes of the sending unit 1501, the receiving unit 1503, and the processing unit 1502 in FIG. 15 may be implemented by the processor 1401 in FIG. 14 by invoking the computer-executable instructions stored in the memory 1403. Alternatively, a function/implementation process of the processing unit 1502 in FIG. 15 may be implemented by the processor 1401 in FIG. 14 by invoking the computer-executable instructions stored in the memory 1403, and functions/implementation processes of the sending unit 1501 and the receiving unit 1503 in FIG. 15 may be implemented through the communication interface 1404 in FIG. 14.

Optionally, when the apparatus 1500 is a chip or a circuit, functions/implementation processes of the sending unit 1501 and the receiving unit 1503 may alternatively be implemented through a pin, a circuit, or the like.

An embodiment of this application further provides a computer-readable storage medium. The computer-readable storage medium stores a computer program or instructions. When the computer program or the instructions are run, the method performed by the first device or the second device in the foregoing method embodiments is implemented. In this way, the functions in the foregoing embodiments may be implemented in a form of a software functional unit and sold or used as an independent product. Based on such an understanding, the technical solutions in embodiments of this application essentially, or the part making a contribution, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The storage medium includes any medium that can store program code, for example, a USB flash drive, a removable hard disk, a ROM, a RAM, a magnetic disk, or an optical disc.

An embodiment of this application further provides a computer program product. The computer program product includes computer program code. When the computer program code is run on a computer, the computer is enabled to perform the method performed by the first device or the second device in any one of the foregoing method embodiments.

An embodiment of this application further provides a processing apparatus, including a processor and an interface. The processor is configured to perform the method performed by the first device or the second device in any one of the foregoing method embodiments.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Various illustrative logical units and circuits described in embodiments of this application may implement or operate the described functions via a general-purpose processor, a digital signal processor (DSP), an application-specific integrated circuit (ASIC), a field-programmable gate array (FPGA) or another programmable logic apparatus, a discrete gate or transistor logic, a discrete hardware component, or any combination of the foregoing designs. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an erasable programmable read-only memory (EPROM), an EEPROM, a register, a hard disk, a removable disk, a CD-ROM, or a storage medium in any other form in the art. For example, the storage medium may connect to the processor, so that the processor can read information from the storage medium and write information into the storage medium. Optionally, the storage medium may alternatively be integrated into the processor. The processor and the storage medium may be disposed in an ASIC, and the ASIC may be disposed in a terminal device. Optionally, the processor and the storage media may alternatively be disposed in different components in the terminal device.

The computer program instructions may alternatively be loaded onto the computer or another programmable data processing device, so that a series of operations and steps are performed on the computer or the another programmable device to generate computer-implemented processing, and instructions executed on the computer or the another programmable device provide steps for implementing a function specified in one or more procedures in a flowchart and/or one or more blocks in a block diagram.

Although embodiments of this application are described with reference to specific features and embodiments thereof, it is clear that various modifications and combinations may be made to embodiments of this application without departing from the scope of embodiments of this application. Correspondingly, embodiments of this application and the accompanying drawings are only example descriptions of embodiments of this application defined by the appended claims, and are considered to have covered any of or all modifications, variations, combinations or equivalents within the scope of embodiments of this application. It is clear that a person skilled in the art can make various modifications and variations to embodiments of this application without departing from the scope of embodiments of this application. Therefore, embodiments of this application are intended to cover these modifications and variations of embodiments this application if they fall within the scope of the claims of embodiments of this application and equivalent technologies thereof.

What is claimed is:

1. A communication method, performed by a first device, wherein the method comprises:

sending reference signals to a second device in a first beam direction M times, wherein:

during each of the M times the reference signals are simultaneously sent through two groups of transmit antennas, during each of M−1 times the reference signals are sent, quantities of transmit antennas used in the two groups of transmit antennas are different, during the remaining one time the reference signals are sent other than the M−1 times, quantities of transmit antennas used in the two groups of transmit antennas are the same, and M is an integer greater than or equal to 2;

receiving first information from the second device, wherein the first information indicates receive phase information of the reference signals; and determining a second beam direction based on the first information, wherein the second beam direction is a beam direction in which the first device sends information to the second device or the first device receives information from the second device.

2. The method according to claim 1, wherein the first information comprises receive phases of the reference signals;

the first information comprises N first phase differences, wherein each first phase difference is a difference between a second phase difference and a third phase difference, the second phase difference is a phase difference between two reference signals sent in the remaining one time, the third phase difference is a phase difference between two reference signals sent in one of the M−1 times, and N is a positive integer less than M; or the first information comprises M phase differences, wherein the M phase differences comprise the second phase difference and the third phase difference.

3. The method according to claim 1, wherein during the remaining one time other than the M−1 times, a total quantity of transmit antennas used in the two groups of transmit antennas is a total quantity of transmit antennas of the first device.

4. The method according to claim 1, wherein the determining a second beam direction based on the first information comprises:

determining an offset angle of the second beam direction relative to the first beam direction based on the first information and the first beam direction.

5. The method according to claim 1, wherein an antenna array of the first device is a linear array, and M=2; or an antenna array of the first device is a planar array, and M is greater than or equal to 2.

6. The method according to claim 1, wherein the method further comprises:

sending second reference signals to the second device in the first beam direction K times, wherein:

during each of the K times the second reference signals are simultaneously sent through the two groups of transmit antennas, during each of the K times the second reference signals are sent, quantities of transmit antennas used in the two groups of transmit antennas are the same, the K times are used to determine a beam direction in which the second device sends information to the first device or the second device receives information from the first device, and K is a positive integer.

7. The method according to claim 6, wherein an antenna array of the second device is a linear array, and K=1; or an antenna array of the second device is a planar array, and K is greater than or equal to 1.

8. The method according to claim 1, wherein the first device is an access network device, the second device is a terminal device, and the reference signals sent M times are channel state information-reference signals (CSI-RSs); or the first device is a terminal device, the second device is an access network device, and the reference signals sent M times are sounding reference signals (SRSs).

9. The method according to claim 1, wherein the method further comprises:

predicting, based on phase offset information, that the second beam direction will change before a next reference signal with a periodicity arrives, wherein the phase offset information indicates a historical phase offset of a beam direction in which the first device sends the information to the second device or the first device receives the information from the second device;

sending or receiving another reference signal before the next reference signal with the periodicity arrives; and using the another reference signal to determine a third beam direction, and the third beam direction is a beam direction in which the first device sends the information to the second device or the first device receives the information from the second device.

10. The method according to claim 9, wherein the method further comprises:

receiving the phase offset information from the second device.

11. The method according to claim 1, wherein the method further comprises:

sending phase offset information to the second device, wherein the phase offset information indicates a historical phase offset of a beam direction in which the first device sends the information to the second device or the first device receives the information from the second device, and the phase offset information is used to predict whether the second beam direction changes.

12. A communication method, applied to a second device, wherein the method comprises:

receiving reference signals from a first device in a first beam direction M times, wherein:

during each of the M times the reference signals are received through two groups of receive antennas, during each of the M times the reference signals are received, quantities of receive antennas used in the two groups of receive antennas are the same, and M is a positive integer; and sending first information to the first device, wherein the first information indicates receive phase information of the reference signals, wherein:

the first information comprises receive phases of the reference signals;

the first information comprises N first phase differences, wherein each first phase difference is a difference between a second phase difference and a third phase difference, the second phase difference is a phase difference between two reference signals comprised in a remaining one time of the M times, the third phase difference is a phase difference between two reference signals comprised in one of M−1 times of reference signals other than the remaining one time, and N is a positive integer less than M; or the first information comprises M phase differences, wherein the M phase differences comprise the second phase difference and the third phase difference.

13. The method according to claim 12, wherein the method further comprises:

receiving second reference signals from the first device in the first beam direction K times, wherein:

during each of the K times the second reference signals are received through the two groups of receive antennas, and during each of the K times the reference signals are received, quantities of receive antennas used in the two groups of receive antennas are different; and determining a fourth beam direction based on second information, wherein the fourth beam direction is a beam direction in which the second device sends information to the first device or the second device receives information from the first device, the second information indicates receive phase information of the second reference signals, and K is a positive integer.

14. The method according to claim 13, wherein the second information comprises receive phases of the second reference signals;

the second information comprises D fourth phase differences, wherein the fourth phase difference is a difference between the second phase difference and a fifth phase difference, the second phase difference is a phase difference between two of the reference signals, and the fifth phase difference is a phase difference between two of the second reference signals; or the second information comprises K phase differences, wherein the K phase differences comprise the fifth phase difference.

15. The method according to claim 13, wherein the determining a fourth beam direction based on second information comprises:

determining an offset angle of the fourth beam direction relative to a current beam direction based on the second information and the current beam direction in which the second device sends the information to the first device or the second device receives the information from the first device.

16. A communication device, comprising:

one or more processors;

one or more memories; and one or more computer programs, wherein the one or more computer programs are stored in the one or more memories, the one or more computer programs comprise instructions, and when the instructions are executed by the one or more processors of the communication device, the communication device is enabled to perform the following method:

sending reference signals to a second device in a first beam direction M times, wherein:

during each of the M times the reference signals are simultaneously sent through two groups of transmit antennas, during each of M−1 times the reference signals are sent, quantities of transmit antennas used in the two groups of transmit antennas are different, during the remaining one time the reference signals are sent other than the M−1 times, quantities of transmit antennas used in the two groups of transmit antennas are the same, and M is an integer greater than or equal to 2;

receiving first information from the second device, wherein the first information indicates receive phase information of the reference signals; and determining a second beam direction based on the first information, wherein the second beam direction is a beam direction in which the first device sends information to the second device or the first device receives information from the second device.

17. The communication device according to claim 16, wherein:

the first information comprises receive phases of the reference signals;

the first information comprises N first phase differences, wherein each first phase difference is a difference between a second phase difference and a third phase difference, the second phase difference is a phase difference between two reference signals sent in the remaining one time, the third phase difference is a phase difference between two reference signals sent in one of the M−1 times, and N is a positive integer less than M; or the first information comprises M phase differences, wherein the M phase differences comprise the second phase difference and the third phase difference.

18. The communication device according to claim 16, wherein during the remaining one time other than the M−1 times, a total quantity of transmit antennas used in the two groups of transmit antennas is a total quantity of transmit antennas of the first device.

19. The communication device according to claim 16, wherein the determining a second beam direction based on the first information comprises:

determining an offset angle of the second beam direction relative to the first beam direction based on the first information and the first beam direction.

* * * * *